(12) United States Patent
Ohno et al.

(10) Patent No.: US 10,293,776 B2
(45) Date of Patent: May 21, 2019

(54) VEHICLE CURTAIN AIRBAG DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Koji Toida, Miyoshi (JP); Takuya Nezaki, Mizunami (JP); Junji Ohashi, Toyota (JP); Yusuke Hayashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 15/710,090

(22) Filed: Sep. 20, 2017

(65) Prior Publication Data

US 2018/0099634 A1  Apr. 12, 2018

(30) Foreign Application Priority Data

Oct. 7, 2016  (JP) .................................. 2016-199434

(51) Int. Cl.
*B60R 21/213* (2011.01)
*B60R 21/232* (2011.01)
(Continued)

(52) U.S. Cl.
CPC .......... *B60R 21/232* (2013.01); *B60R 21/213* (2013.01); *B60R 21/235* (2013.01); *B60R 21/2338* (2013.01); *B60R 21/23138* (2013.01); *B60R 2021/0004* (2013.01); *B60R 2021/0006* (2013.01); *B60R 2021/0009* (2013.01);
(Continued)

(58) Field of Classification Search
CPC ................ B60R 21/232; B60R 21/213; B60R 21/23138; B60R 21/2338; B60R 21/235; B60R 2021/23386; B60R 2021/0004; B60R 2021/0006; B60R 2021/0009; B60R 2021/0023; B60R 2021/0048; B60R 2021/23153; B60R 2021/23509
See application file for complete search history.

(56) References Cited

U.S. PATENT DOCUMENTS 6,042,141 A * 3/2000 Welch ................... B60R 21/232
280/729
6,152,481 A * 11/2000 Webber ................. B60R 21/232
280/728.2
(Continued)

FOREIGN PATENT DOCUMENTS

JP          5824584 B2   11/2015
JP        2016-049882 A   4/2016
JP        2016-055824 A   4/2016

*Primary Examiner* — Laura Freedman
(74) *Attorney, Agent, or Firm* — Oliff PLC

(57) ABSTRACT

There is provided a vehicle curtain airbag device including: an inflator; a curtain airbag; a rear seat side impact chamber; a front chamber; and a protective cloth that is configured separately from the curtain airbag, is anchored to at least an upper edge side of the curtain airbag, is disposed ranging from a vehicle width direction inner surface of a front portion of the rear seat side impact chamber to a vehicle width direction inner surface of a rear portion of the front chamber, in the completely deployed state of the curtain airbag, and covers, from a vehicle width direction inner side, a recess portion that has different heights in a bag thickness direction and that is formed between the front portion of the rear seat side impact chamber and the rear portion of the front chamber.

7 Claims, 12 Drawing Sheets

(51) Int. Cl.
  *B60R 21/235*  (2006.01)
  *B60R 21/2338*  (2011.01)
  *B60R 21/231*  (2011.01)
  *B60R 21/00*  (2006.01)
(52) U.S. Cl.
  CPC ............... *B60R 2021/0048* (2013.01); *B60R 2021/23153* (2013.01); *B60R 2021/23386* (2013.01); *B60R 2021/23509* (2013.01)

(56) References Cited

U.S. PATENT DOCUMENTS

| | | | | |
|---|---|---|---|---|
| 6,672,612 B2* | 1/2004 | Sauer | ................... | B60R 21/232 280/730.2 |
| 7,222,877 B2* | 5/2007 | Wipasuramonton | ......................... | B60R 21/214 280/729 |
| 7,264,269 B2* | 9/2007 | Gu | ........................ | B60R 21/232 280/729 |
| 7,322,600 B2* | 1/2008 | Inoue | ................... | B60R 21/232 280/730.2 |
| 7,350,804 B2* | 4/2008 | Bakhsh | ................ | B60R 21/232 280/730.2 |
| 7,731,227 B2* | 6/2010 | Hotta | .................... | B60R 21/213 280/730.2 |
| 7,735,863 B2* | 6/2010 | Walston | ................ | B60R 21/232 280/730.2 |
| 7,770,917 B2* | 8/2010 | Henderson | ............ | B60R 21/232 280/730.2 |
| 7,828,322 B2* | 11/2010 | Breuninger | ........... | B60R 21/231 280/730.2 |
| 8,353,530 B2* | 1/2013 | Czach | ................... | B60R 21/232 280/730.2 |
| 8,596,673 B2* | 12/2013 | Ruedisueli | ............... | B60R 21/21 280/730.2 |
| 8,740,247 B1* | 6/2014 | Jovicevic | .............. | B60R 21/232 280/730.2 |
| 8,789,846 B2* | 7/2014 | Wipasuramonton | ......................... | B60R 21/232 280/730.2 |
| 9,114,776 B2* | 8/2015 | Thomas | .............. | B60R 21/2338 |
| 9,487,179 B2* | 11/2016 | Takedomi | ........... | B60R 21/2334 |
| 9,505,373 B2* | 11/2016 | Moon | ................... | B60R 21/232 |
| 9,771,046 B2* | 9/2017 | Lee | ......................... | B60R 21/232 |
| 9,776,593 B2* | 10/2017 | Je | ........................... | B60R 21/232 |
| 10,017,146 B2* | 7/2018 | Sugimori | ............. | B60R 21/232 |

\* cited by examiner

VEHICLE CURTAIN AIRBAG DEVICE

CROSS-REFERENCE TO RELATED APPLICATION

This application is based on and claims priority under 35 U.S.C. 119 from Japanese Patent Application No. 2016-199434 filed on Oct. 7, 2016, the disclosure of which is incorporated by reference herein.

BACKGROUND

Technical Field

The present invention relates to a vehicle curtain airbag device.

Related Art

Japanese Patent No. 5,824,584 discloses a vehicle curtain airbag device where a separate protective cloth is anchored, at its upper edge portion, to a vehicle width direction inner surface of a front seat side impact chamber that inflates and deploys to protect the head of a front seat occupant at the time of a side impact or at the time of a rollover. Because of this, at the time of a frontal impact where the head of the front seat occupant moves due to inertia in the vehicle forward direction and outward in the vehicle width direction, such as at the time of a small overlap impact or at the time of an oblique impact, the head comes into abutting contact with the protective cloth and slides on the front seat side impact chamber together with the protective cloth, so that the head is restrained from turning about an axis in the vehicle up and down direction.

In this connection, at the time of a small overlap impact or at the time of an oblique impact, the head of a rear seat occupant behaves as follows. The rear seat occupant is restrained in the rear seat by a three-point seat belt device. For this reason, the head of the rear seat occupant first moves due to inertia in the vehicle forward direction and outward in the vehicle width direction and then rebounds in the vehicle rearward direction and outward in the vehicle width direction because of the webbing on the shoulder side. Particularly in a vehicle where the shoulder anchor is set in the rear pillar, the head of the rear seat occupant tends to rebound in the vehicle rearward direction and further outward in the vehicle width direction.

Through various experiments it (also including the cause) was found that when the head of the rear seat occupant rebounds and comes into abutting contact with the front portion side of the rear seat side impact chamber under this kind of circumstance, there is the potential for the head to suddenly turn about an axis in the vehicle up and down direction.

SUMMARY

In consideration of the above circumstances, it is an object of the present invention to obtain a vehicle curtain airbag device which, at the time of a frontal impact including at least at the time of a small overlap impact and at the time of an oblique impact, can restrain or prevent the head of a rear seat occupant from suddenly turning about an axis in the vehicle up and down direction when the rebounding head of the rear seat occupant comes into abutting contact with a recess portion having different heights in the bag thickness direction and formed between a front portion of a rear seat side impact chamber and a rear portion of a front chamber.

A vehicle curtain airbag device pertaining to a first aspect of the invention includes: an inflator that is activated to discharge a gas not only at a time of a side impact but also at a time of a frontal impact, the front impact including a small overlap impact and an oblique impact; a curtain airbag which, when the gas from the inflator is supplied thereto, becomes inflated and deployed in the shape of a curtain in the vehicle downward direction from a vehicle width direction outer end portion of a vehicle ceiling; a rear seat side impact chamber that configures part of the curtain airbag and is disposed on the vehicle width direction outer side of a head of an occupant who is seated in a rear seat and wearing a three-point seat belt device; a front chamber that configures part of the curtain airbag, is disposed on a vehicle front side of the rear seat side impact chamber with a non-inflating portion being interposed in between, and whose thickness measured inward in the vehicle width direction from the non-inflating portion in a completely deployed state of the curtain airbag, is thinner than a thickness of the rear seat side impact chamber measured inward in the vehicle width direction from the non-inflating portion; and a protective cloth that is configured separately from the curtain airbag, is anchored to at least an upper edge side of the curtain airbag, is disposed ranging from a vehicle width direction inner surface of a front portion of the rear seat side impact chamber to a vehicle width direction inner surface of a rear portion of the front chamber, in the completely deployed state of the curtain airbag, and covers, from a vehicle width direction inner side, a recess portion that has different heights in a bag thickness direction and formed between the front portion of the rear seat side impact chamber and the rear portion of the front chamber.

According to the first aspect of the invention, the inflator of the vehicle curtain airbag device is activated to discharge the gas not only at the time of a side impact but also at the time of a frontal impact including at least a small overlap impact and an oblique impact. Because of this, the curtain airbag becomes inflated and deployed in the shape of a curtain in the vehicle downward direction from the vehicle width direction outer end portion of the ceiling.

In this connection, at the time of a small overlap impact or at the time of an oblique impact, sometimes the head of the rear seat occupant on the impact side moves due to inertia in the vehicle forward direction and outward in the vehicle width direction and then rebounds toward the front portion side of the rear seat side impact chamber because of the three-point seat belt device.

Here, in the curtain airbag, the front chamber is disposed on the vehicle front side of the rear seat side impact chamber with the non-inflating portion being interposed in between, and the thickness of the front chamber measured inward in the vehicle width direction from the non-inflating portion in the completely deployed state of the curtain airbag is thinner than the thickness of the rear seat side impact chamber measured inward in the vehicle width direction from the non-inflating portion. For this reason, in the completely deployed state of the curtain airbag, the recess portion having different heights in the bag thickness direction is formed between the front portion of the rear seat side impact chamber and the rear portion of the front chamber. As a result, through a series of various experiments it was found that if the protective cloth of the present invention is not provided, first, it is easy for the rebounding head of the rear seat occupant to get caught in the recess portion and, second, when the head of the rear seat occupant slides on (rubs against) the vehicle width direction inner surface of the front portion of the rear seat side impact chamber, the head of the occupant suddenly turns about an axis in the vehicle up and down direction owing to receiving frictional force between the head and that surface.

In light of this knowledge, in the present invention, the protective cloth configured separately from the curtain airbag is anchored to at least the upper edge side of the curtain airbag. In the completely deployed state of the curtain airbag the protective cloth is disposed ranging from the vehicle width direction inner surface of the front portion of the rear seat side impact chamber to the vehicle width direction inner surface of the rear portion of the front chamber and covers, from the vehicle width direction inner side, the recess portion having different heights in the bag thickness direction and formed between the front portion of the rear seat side impact chamber and the rear portion of the front chamber. For this reason, in the region where the protective cloth is provided, (seemingly) the recess portion having different heights disappears. Moreover, because the thickness of the front chamber measured inward in the vehicle width direction from the non-inflating portion in the completely deployed state of the curtain airbag is thinner than the thickness of the rear seat side impact chamber measured inward in the vehicle width direction from the non-inflating portion, when seen in a vehicle plan view the protective cloth is disposed sloping outward in the vehicle width direction from the front portion of the rear seat side impact chamber to the rear portion of the front chamber. As a result, the rebounding head of the rear seat occupant comes into abutting contact not with the recess portion but with the protective cloth, and it becomes difficult for the head to get caught in the recess portion. Furthermore, because the recess portion having different heights is covered by the protective cloth, the head no longer directly receives frictional force from the vehicle width direction inner surface of the front portion of the rear seat side impact chamber.

It will be noted that "covers, from the vehicle width direction inner side, a recess portion" includes both a case where the protective cloth covers, from the vehicle width direction inner side, the entire recess portion having different heights in the bag thickness direction and a case where the protective cloth covers, from the vehicle width direction inner side, that region of the recess portion with which it is supposed that the rebounding head of the rear seat occupant will come into abutting contact.

A vehicle curtain airbag device pertaining to a second aspect of the invention includes the first aspect, wherein the protective cloth is a cloth whose out-of-plane stiffness is higher than that of a base cloth configuring the curtain airbag.

According to the second aspect of the invention, the out-of-plane stiffness of the protective cloth is set higher than that of the base cloth configuring the curtain airbag, so it is difficult for the protective cloth to roll up and the recess portion having different heights is tightly covered by the protective cloth. For this reason, it is difficult for the protective cloth to become sunken when the rebounding head of the rear seat occupant comes into abutting contact with the protective cloth. As a result, it becomes even more difficult for the rebounding head of the rear seat occupant to get caught in the recess portion.

It will be noted that "out-of-plane stiffness" means stiffness (difficulty of deformation) when the protective cloth is thought of as being a planar member and a force is applied in a direction perpendicular to the plane of the protective cloth.

Furthermore, because the out-of-plane stiffness of the protective cloth is set high, the protective cloth has high reliability in terms of ensuring that the rebounding head of the rear seat occupant does not get caught in the recess portion.

A vehicle curtain airbag device pertaining to a third aspect of the invention includes the first or second aspect, wherein the coefficient of friction of the vehicle width direction outer surface of the protective cloth is set lower than the coefficient of friction of the vehicle width direction inner surface of the rear seat side impact chamber.

According to the third aspect of the invention, the coefficient of friction of the vehicle width direction outer surface of the protective cloth is set lower than the coefficient of friction of the vehicle width direction inner surface of the rear seat side impact chamber, so it becomes easier for the protective cloth to slide on the vehicle width direction inner surface of the front portion of the rear seat side impact chamber. For this reason, when the rebounding head of the rear seat occupant comes into abutting contact with the protective cloth, the head slides together with the protective cloth in the vehicle rearward direction on the surface of the front portion of the rear seat side impact chamber.

Furthermore, because the coefficient of friction of the vehicle width direction outer surface of the protective cloth is set lower than the coefficient of friction of the vehicle width direction inner surface of the rear seat side impact chamber, the thickness of the protective cloth itself does not need to be so thick.

A vehicle curtain airbag device pertaining to a fourth aspect of the invention includes any one of the first to third aspects, wherein the protective cloth is anchored to a lower edge side in addition to the upper edge side of the curtain airbag.

According to the fourth aspect of the invention, the protective cloth is anchored to the lower edge side in addition to the upper edge side of the curtain airbag, so the protective cloth is reliably unfolded when the rear seat side impact chamber inflates and deploys, and it becomes difficult for the bottom of the protective cloth to roll up when the rebounding head of the rear seat occupant contacts the protective cloth.

A vehicle curtain airbag device pertaining to a fifth aspect of the invention includes any one of the first to fourth aspects, wherein the protective cloth is partially disposed in an up and down direction central region of the curtain airbag with which the head of the occupant seated in the rear seat comes into abutting contact.

According to the fifth aspect of the invention, the protective cloth is partially disposed in the up and down direction central region of the curtain airbag with which the head of the occupant seated in the rear seat comes into abutting contact, so the area of the protective cloth becomes smaller compared to a case where the protective cloth is entirely disposed from the upper edge portion to the lower edge portion of the curtain airbag. For this reason, the package does not become bulky when the protective cloth is folded up together with the curtain airbag.

A vehicle curtain airbag device pertaining to a sixth aspect of the invention includes the fifth aspect, wherein one end portion of a first strap is connected or joined to an upper edge side of the protective cloth and another end portion of the first strap is anchored to an upper edge portion of the curtain airbag, and one end portion of a second strap is connected or joined to a lower edge side of the protective cloth and another end portion of the second strap is anchored to a lower edge portion of the curtain airbag.

According to the sixth aspect of the invention, the upper edge side of the protective cloth disposed in the up and down direction central region of the curtain airbag is coupled by the first strap to the upper edge portion of the curtain airbag, and the lower edge side of the protective cloth is coupled by the second strap to the lower edge portion of the curtain airbag. For this reason, the package size can be reduced more, and it becomes easier for the protective cloth to slide in the vehicle rearward direction together with the rebounding head of the rear seat occupant.

A vehicle curtain airbag device pertaining to a seventh aspect of the invention includes the sixth aspect, wherein the positions at which the first strap and the second strap are anchored to the curtain airbag are disposed offset in the vehicle rearward direction with respect to positions at which the first strap and the second strap are connected or joined to the protective cloth.

According to the seventh aspect of the invention, the positions at which the first strap and the second strap are anchored to the curtain airbag are disposed offset in the vehicle rearward direction with respect to the positions at which the first strap and the second strap are connected or joined to the protective cloth, so the first strap and the second strap have extra lengths. When the rebounding head of the rear seat occupant comes into abutting contact with the protective cloth, it becomes easier for the protective cloth to move in the vehicle rearward direction in correspondence to the first strap and the second strap having extra lengths.

As described above, the vehicle curtain airbag device pertaining to the first aspect of the invention has the superior effect that, at the time of a frontal impact including at least at the time of a small overlap impact and at the time of an oblique impact, it can restrain or prevent the head of the rear seat occupant from suddenly turning about an axis in the vehicle up and down direction when the rebounding head of the rear seat occupant comes into abutting contact with the recess portion having different heights in the bag thickness direction and formed between the front portion of the rear seat side impact chamber and the rear portion of the front chamber.

The vehicle curtain airbag device pertaining to the second aspect of the invention has the superior effect that it can effectively restrain or prevent the rebounding head of the rear seat occupant from getting caught in the recess portion and therefore can enhance reliability with respect to restraining or preventing the rebounding head of the rear seat occupant from suddenly turning about an axis in the vehicle up and down direction.

The vehicle curtain airbag device pertaining to a third aspect of the invention has the superior effects that it can effectively restrain or prevent the rebounding head of the rear seat occupant from suddenly turning about an axis in the vehicle up and down direction and the package does not become bulky when the protective cloth is folded up together with the curtain airbag.

The vehicle curtain airbag device pertaining to the fourth aspect of the invention has the superior effect that it can restrain or prevent the occurrence of deployment problems with the protective cloth and the occurrence of rolling-up of the protective cloth and can allow the protective cloth to more reliably exhibit its original role.

The vehicle curtain airbag device pertaining to the fifth aspect of the invention has the superior effect that the package size can be reduced.

The vehicle curtain airbag device pertaining to the sixth aspect of the invention has the superior effects that the package size can be reduced more and it can restrain or prevent even more the rebounding head of the rear seat occupant from turning about an axis in the vehicle up and down direction.

The vehicle curtain airbag device pertaining to the seventh aspect of the invention has the superior effects that the ability of the protective cloth to follow the movement of the rebounding head of the rear seat occupant in the vehicle rearward direction is good and the head can be effectively restrained or prevented from turning about an axis in the vehicle up and down direction.

BRIEF DESCRIPTION OF THE DRAWINGS

Exemplary embodiments of the present invention will be described in detail based on the following figures, wherein.

DETAILED DESCRIPTION

First Embodiment

A vehicle curtain airbag device 10 pertaining to a first embodiment of the present invention will be described below using FIG. 1 to FIG. 5B. It will be noted that arrow FR appropriately shown in these drawings indicates a vehicle forward direction, arrow UP indicates a vehicle upward direction, and arrow IN indicates an inward direction in a vehicle width direction.

Figure 1:
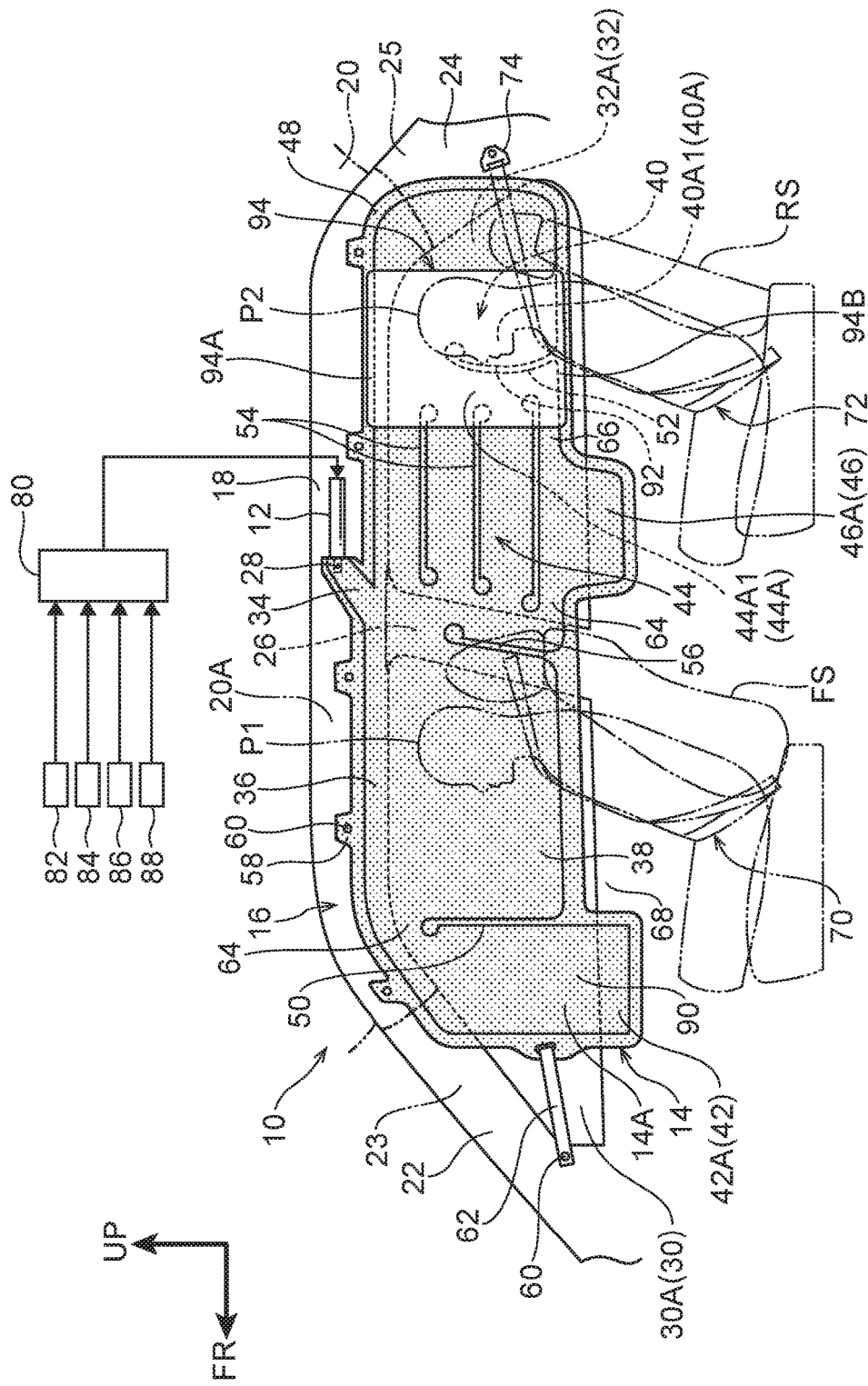
FIG. 1 is a side view, seen from a cabin interior, showing an activated state of a vehicle curtain airbag device pertaining to a first embodiment.

In FIG. 1, an activated state of the vehicle curtain airbag device 10 pertaining to the present embodiment is shown by way of a side view seen from a cabin interior. As shown in FIG. 1, the vehicle curtain airbag device 10 is equipped with an airbag module 16. The airbag module 16 is configured to include a substantially cylindrical inflator 12, which generates a gas at the time of a side impact, and a curtain airbag 14, which is connected to the inflator 12 and inflates and deploys upon receiving a supply of the gas generated by the inflator 12. It will be noted that the inflator 12 of the vehicle curtain airbag device 10 pertaining to the present embodiment is activated not only at the time of a side impact but also at the time of a rollover. Furthermore, the inflator 12 is also activated at the time of special types of frontal impacts, such as at the time of a small overlap impact and at the time of an oblique impact, and is also activated at the time of a full-overlap head-on impact and at the time of an offset impact. That is to say, the inflator 12 of the vehicle curtain airbag device 10 pertaining to the present embodiment is configured to be activated at the time of a side impact, at the time of a rollover, and at the time of a frontal impact.

The airbag module 16, in a state before installation in the vehicle, is made into an assembly as a slender elongate member with the curtain airbag 14 being folded up in it. The airbag module 16 in this state is stored in a space between a roof side rail 18 and a vehicle width direction outer end portion 20A of a roof headlining 20 that is a molded ceiling, a space between a front pillar 22 and a front pillar garnish 23 that is disposed on the cabin interior side of the front pillar 22, and a space between a rear pillar 24 and a rear pillar garnish 25 that is disposed on the cabin interior side of the rear pillar 24. It will be noted that in FIG. 1 parting lines of the roof headlining 20, the front pillar garnish 23, and the rear pillar garnish 25 are indicated by hypothetical lines (long dashed double-dotted lines).

The inflator 12 is formed in a slender cylindrical shape and is disposed with its axial direction coinciding with the vehicle front and rear direction on the vehicle upper side of a center pillar 26. Plural gas discharge holes 28 are formed in the outer peripheral portion of the distal end of the inflator 12. The inside of the inflator 12 is charged with a gas generant as an example, and when the gas generant combusts, a large amount of gas is produced and discharged from the gas discharge holes 28. The inflator 12 having the above configuration is anchored to the roof side rail 18 via a bracket (not shown in the drawings).

The curtain airbag 14 is, as seen in a vehicle side view, configured as a substantially rectangular bag-like cloth member having a size that can substantially cover both a side window 30A of a side door 30 of a front seat FS and a side window 32A of a side door 32 of a rear seat RS. More specifically, the curtain airbag 14 is equipped with a gas introduction portion 34 into which the distal end side of the inflator 12 is inserted, a gas supply path 36 that extends linearly in the vehicle front and rear direction along the upper edge of the curtain airbag 14, a front seat side impact chamber 38 that corresponds to a head protection area for an occupant (a front seat occupant P1) seated in the front seat FS and becomes inflated and deployed on the vehicle width direction outer side of the head of the front seat occupant P1, and a rear seat side impact chamber 40 that corresponds to a head protection area for an occupant (a rear seat occupant P2) seated in the rear seat RS and becomes inflated and deployed on the vehicle width direction outer side of the head of the rear seat occupant P2. Moreover, the curtain airbag 14 is equipped with a front seat delay chamber 42 adjacently provided on the vehicle front side of the front seat side impact chamber 38 with a later-described second non-inflating portion 50 being interposed in between, a front chamber 44 disposed on the vehicle front side of the rear seat side impact chamber 40 with a later-described third non-inflating portion 52 being interposed in between, and a rear seat delay chamber 46 provided on the vehicle lower side of the front chamber 44.

Sections of the curtain airbag 14 other than those described above are non-inflating portions into which the gas does not flow. Namely, a first non-inflating portion 48 is set on the outer peripheral portion of the curtain airbag 14, and a second non-inflating portion 50 extending in the vehicle up and down direction is set between the front seat side impact chamber 38 and the front seat delay chamber 42. Furthermore, a third non-inflating portion 52 extending in the vehicle up and down direction is set between the rear seat side impact chamber 40 and the front chamber 44. Moreover, fourth non-inflating portions 54 extending in the vehicle front and rear direction are set in plural tiers in the vehicle up and down direction on the vehicle front side of the rear seat side impact chamber 40. Furthermore, a fifth non-inflating portion 56 extending in the vehicle up and down direction is set between the front chamber 44 and the front seat side impact chamber 38.

Plural anchoring tabs 58 are integrally formed at appropriate intervals on the upper edge portion of the first non-inflating portion 48 of the curtain airbag 14. Each anchoring tab 58 is formed as a trapezoidal tab and is anchored to the vehicle body, such as the roof side rail 18, by anchors 60 (the specific structure thereof will be described later in a third embodiment) comprising clips or anchoring bolts, for example. Moreover, one end portion of a strap-like tension belt 62 is attached to the front end portion of the curtain airbag 14. The other end portion of the tension belt 62 is anchored by an anchor 60 to the front pillar 22.

The parts of the curtain airbag 14 to which the gas is supplied will now be described in greater detail. The gas introduction portion 34 is formed in the vehicle front and rear direction substantially middle portion of the upper edge of the curtain airbag 14. The gas introduction portion 34 also communicates with the vehicle front and rear direction middle portion of the gas supply path 36. Because the inflator 12 is connected to the gas introduction portion 34, the gas generated by the inflator 12 is supplied via the gas introduction portion 34 to the inside of the curtain airbag 14. In the present embodiment, the gas introduction portion 34 is provided in the vehicle front and rear direction substantially middle portion of the upper edge portion of the curtain airbag 14. However, the gas introduction portion 34 is not limited to this and may also be provided in the vehicle front and rear direction front portion or rear portion, or in both the front portion and the rear portion, of the upper edge portion of the curtain airbag. In a case where the gas introduction portion is provided in both the vehicle front and rear direction front portion and rear portion of the upper edge portion of the curtain airbag, two front and rear inflators also become set.

The front seat side impact chamber 38 is configured to inflate and deploy across a range from the vicinity of the vehicle front and rear direction middle portion of the side window 30A of the front seat FS to a position at which it overlaps the center pillar 26. The front seat delay chamber 42 is disposed via the second non-inflating portion 50 on the vehicle front and rear direction front side of the front seat side impact chamber 38. The front seat delay chamber 42 is formed so as to inflate in a cylindrical shape whose longitudinal direction coincides with the vehicle up and down direction. The upper end portion of the front seat delay chamber 42 communicates via an aperture portion 64 with the front end portion of the gas supply path 36. A lower end portion 42A of the front seat delay chamber 42 is set so as to overlap, in the vehicle up and down direction, a door beltline portion 68.

The rear seat side impact chamber 40 is configured to inflate and deploy so as to cover the rear region of the side window 32A of the rear seat RS as seen from the cabin interior. The upper portion of the rear seat delay chamber 46 communicates via aperture portions 66 with the lower portion of the front chamber 44. A lower end portion 46A of the rear seat delay chamber 46 is set so as to overlap, in the vehicle up and down direction, the door beltline portion 68.

The upper body of the front seat occupant P1 is restrained in the front seat FS by a seat belt device 70 for the front seat, and the upper body of the rear seat occupant P2 is restrained in the rear seat RS by a seat belt device 72 for the rear seat. Furthermore, a shoulder anchor 74 of the seat belt device 72 for the rear seat is installed in the rear pillar 24. Moreover, it is supposed that the front seat occupant P1 and the rear seat occupant P2 are, as an example, World Side Impact Dummies (WorldSID) AM50 (representing a 50th percentile American adult male).

Next, a deployment control system of the vehicle curtain airbag device 10 will be described. The activation of the vehicle curtain airbag device 10 is controlled by an electronic control unit (ECU) 80. Connected to an input side of the ECU 80 are, for example, a frontal impact detection sensor 82, an on-board camera 84, a side impact detection sensor 86, and a rollover detection sensor 88. Connected to an output side of the ECU 80 is the inflator 12 (i.e., a squib not shown in the drawings) of the vehicle curtain airbag device 10.

As for the type of the frontal impact detection sensor 82, it is possible to use an acceleration sensor, for example. By using more than one acceleration sensor, not only an impact but also the impact type can be detected. For example, a technique can be employed where front satellite sensors (not shown in the drawings) are disposed in the vicinities of front end portions of a right and left pair of front side members disposed on both vehicle width direction sides of the front portion of the vehicle.

If accelerations that are substantially the same as each other and exceed a predetermined threshold value are detected by the right and left satellite sensors, it can be judged that the host vehicle has sustained a full-overlap frontal impact. Furthermore, in a case where a large acceleration equal to or greater than the predetermined threshold value has been detected by just either one of the right and left satellite sensors, it can be judged that the host vehicle has sustained an offset impact. Moreover, in a case where plural threshold values serving as references are set beforehand and an acceleration exceeding the higher threshold value has been detected by just one of the right and left satellite sensors, it can be judged that a small overlap impact has occurred on the side corresponding to the satellite sensor that detected that acceleration. Furthermore, by using image information detected by the on-board camera 84 in addition to the values detected by the satellite sensors, it can be judged that an oblique impact has occurred.

Here, the aforementioned impact types will be described in greater detail. An "oblique impact" is an impact from an oblique frontal direction defined, for example, by the U.S. National Highway Traffic Safety Administration (NHTSA) (as an example, an impact where the relative angle with the impact partner is 15° and the amount of overlap in the vehicle width direction is about 35%). In this embodiment, as an example, an oblique impact at a relative velocity of 90 km/hr is supposed. Furthermore, a "small overlap impact" is a type of frontal impact to an automobile where the amount of overlap in the vehicle width direction with the impact partner as defined by the U.S. Insurance Institute for Highway Safety (IIHS), for example, is 25% or less. For example, a frontal impact offset to the vehicle width direction outer side of a front side member that is a vehicle body frame corresponds to a small overlap impact. In this embodiment, as an example, a small overlap impact at a relative velocity of 64 km/hr is supposed. Moreover, a "full-overlap frontal impact" is an impact when a test vehicle has been crashed head-on into a concrete barrier at a speed of 55 km/hr.

The curtain airbag 14 having the above configuration is configured by a double weave that produces a tube-shaped cloth. For that reason, as shown in FIG. 2B, a coating of silicone rubber, for example, for preventing the gas supplied to the inside of the curtain airbag 14 from leaking is applied to the outer surface of a base cloth 14A of the curtain airbag 14. This layer will be called a "coating 90" below.

Figure 4A:
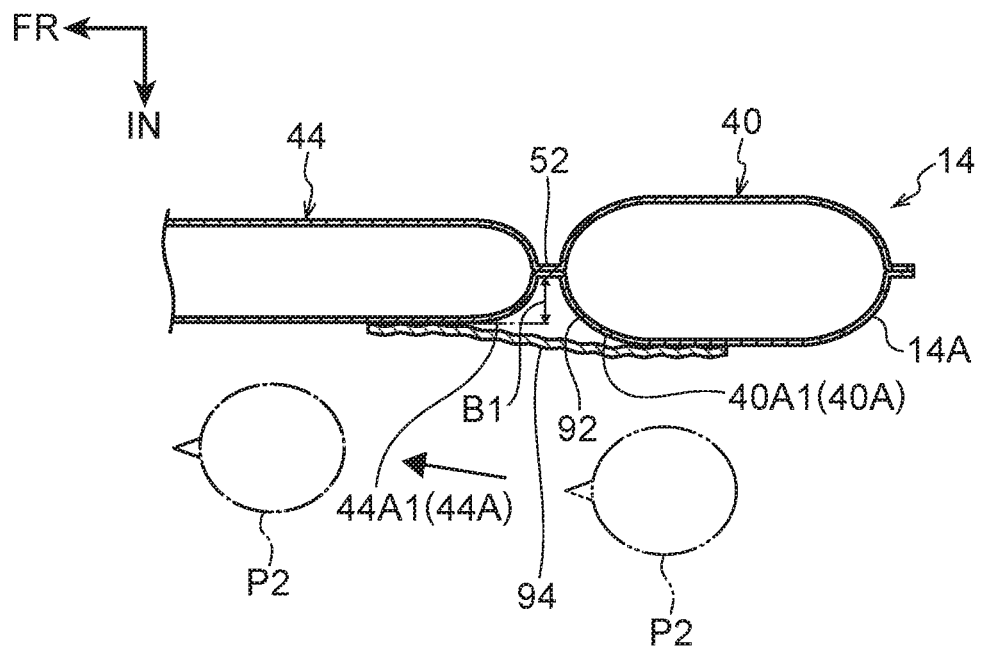
FIG. 4A is a plan sectional view showing a state in which the rear seat occupant has moved due to inertia in the vehicle forward direction in a state in which the vehicle curtain airbag device pertaining to the first embodiment equipped with the protective cloth has been activated.
Figure 4B:
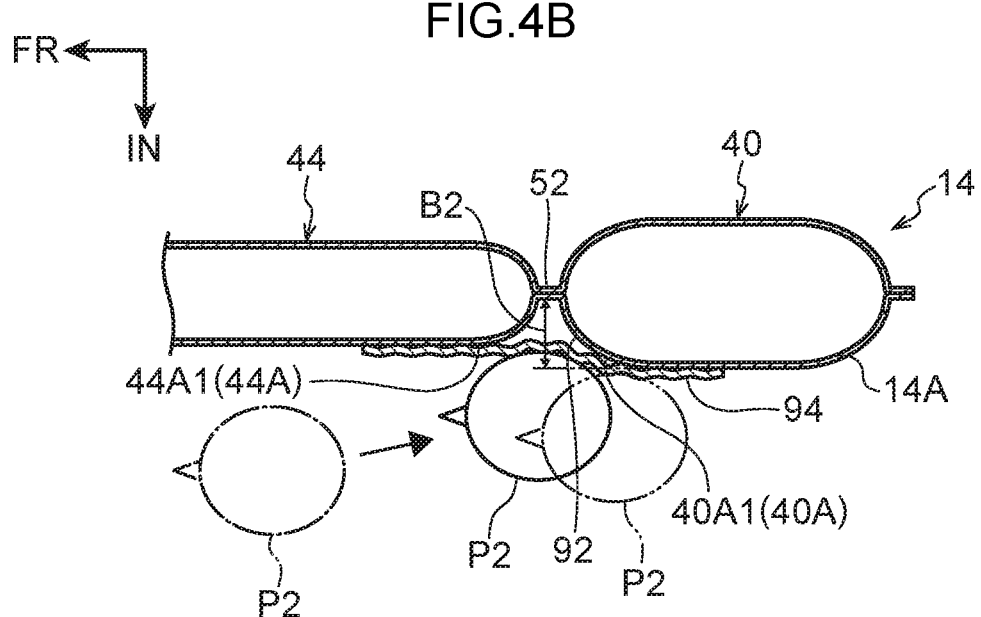
FIG. 4B is a plan sectional view showing the head of the rear seat occupant rebounding from the state in FIG. 4A, coming into abutting contact with the protective cloth, which covers a recess portion having different heights and formed between a rear seat side impact chamber and a front chamber, and moving in the vehicle rearward direction.

Here, as shown in FIG. 4A and FIG. 4B, in the completely deployed state of the curtain airbag 14, a thickness B1 (see FIG. 4A) of the front chamber 44 measured inward in the vehicle width direction from the third non-inflating portion 52 is set thinner than a thickness B2 (see FIG. 4B) of the rear seat side impact chamber 40 measured inward in the vehicle width direction from the third non-inflating portion 52. Because of this, a recess portion 92 having different heights in the bag thickness direction owing to the differences in the thicknesses of the chambers is formed between a front portion 40A of the rear seat side impact chamber 40 and a rear portion 44A of the front chamber 44.

As shown in FIG. 1 to FIG. 4B, a protective cloth 94 configured separately from the curtain airbag 14 is disposed on the rear seat side impact chamber 40 side of the curtain airbag 14.

Figure 2A:
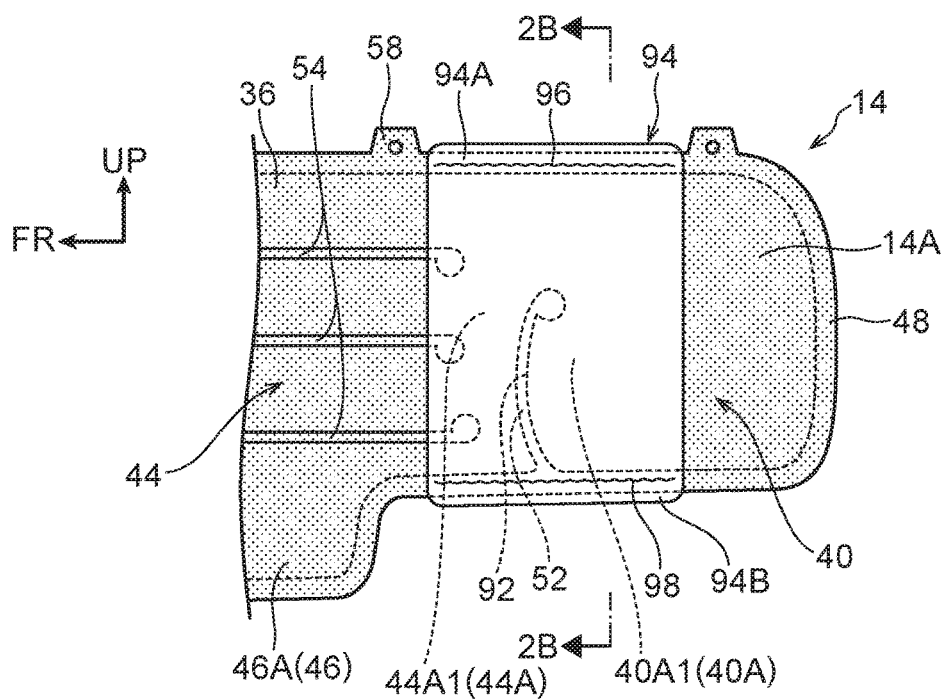
FIG. 2A is an enlarged side view mainly showing a protective cloth of a curtain airbag shown in FIG. 1.
Figure 2B:
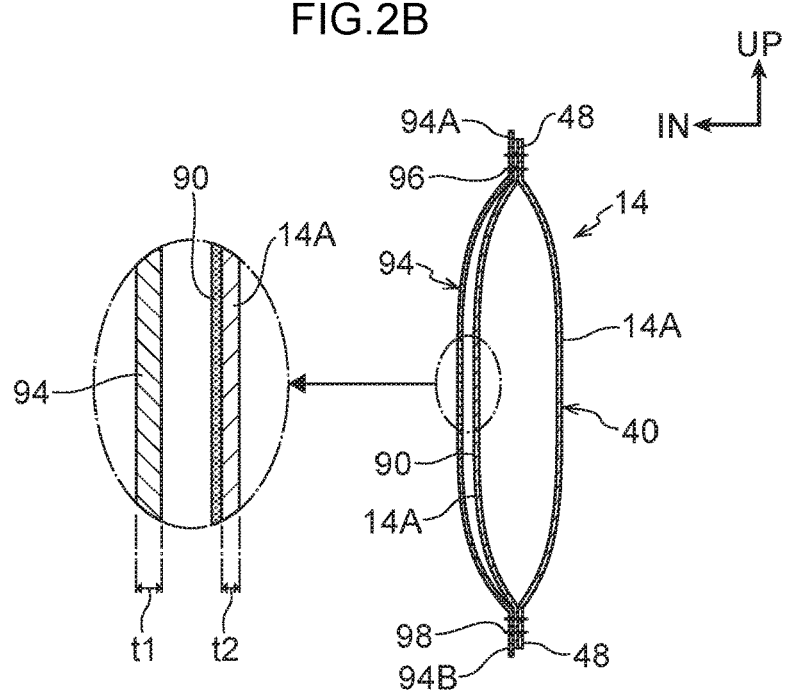
FIG. 2B is an enlarged longitudinal sectional view along line 2B-2B of FIG. 2.

Specifically, as shown in FIG. 2A, the protective cloth 94 is configured as a rectangular cloth-like member. Furthermore, the protective cloth 94 is disposed ranging from a vehicle width direction inner surface 40A1 of the front portion 40A of the rear seat side impact chamber 40 to a vehicle width direction inner surface 44A1 of the rear portion 44A of the front chamber 44. An upper edge portion 94A of the protective cloth 94 is anchored by sewing to the upper edge side (the first non-inflating portion 48 positioned on the upper edge side) of the curtain airbag 14 (to thereby form a first anchored portion 96). Similarly, a lower edge portion 94B of the protective cloth 94 is anchored by sewing to the lower edge side (the first non-inflating portion 48 positioned on the lower edge side) of the curtain airbag 14 (to thereby form a second anchored portion 98). In the completely deployed state of the curtain airbag 14, the recess portion 92 formed between the vehicle width direction inner surface 40A1 of the front portion 40A of the rear seat side impact chamber 40 and the vehicle width direction inner surface 44A1 of the rear portion 44A of the front chamber 44 is covered from the vehicle width direction inner side by the protective cloth 94.

Furthermore, the protective cloth 94 is a cloth whose out-of-plane stiffness is higher than that of the base cloth 14A configuring the curtain airbag 14. It will be noted that "out-of-plane stiffness" means stiffness (difficulty of deformation) when the protective cloth 94 is thought of as being a planar member and a force is applied in a direction perpendicular to the plane of the protective cloth 94. Specifically, in the present embodiment, a thickness t1 (see FIG. 2B) of the protective cloth 94 is made thicker than a thickness t2 of the base cloth 14A by, for example, laying on top of each other more than one cloth that is of the same material as that of the base cloth 14A of the curtain airbag 14 to form the protective cloth 94. Moreover, by sewing a plurality of the cloths together along their outer peripheries and diagonals, for example, it becomes difficult for the plural cloths to become deformed compared to just one of the cloths. It will be noted that the protective cloth may also be configured by a raw material having the material property that it does not become deformed as easily as the base cloth 14A. Although its out-of-plane stiffness is higher than that of the single base cloth 14A, the protective cloth 94 is folded up together with the curtain airbag 14 and stored.

(Action and Effects of Present Embodiment)

Next, the action and effects of the present embodiment will be described.

At the time of a side impact, the fact that the host vehicle has sustained a side impact is detected on the basis of detection information from the side impact detection sensor 86. Because of this, the inflator 12 is activated by the ECU 80 and the curtain airbag 14 becomes inflated and deployed in the shape of a curtain along the side windows 30A and 32A in the vehicle downward direction from the vehicle width direction outer end portion 20A of the roof headlining 20. When the curtain airbag 14 becomes inflated and deployed, the front seat side impact chamber 38 becomes disposed on the vehicle width direction outer side of the head of the front seat occupant P1, and the rear seat side impact chamber 40 becomes disposed on the vehicle width direction outer side of the head of the rear seat occupant P2.

Furthermore, at the time of a rollover, the fact that the host vehicle has rolled over is detected on the basis of detection information from the rollover detection sensor 88. Because of this, the curtain airbags 14 on both the right and left sides become inflated and deployed in the same way as described above. At this time, the front seat delay chambers 42 inflate and deploy later than the front seat side impact chambers 38, and the lower end portions 42A thereof become retained, from the cabin interior side, on the door beltline portions 68 of the side doors 30 of the front seats FS. Similarly, the rear seat delay chambers 46 inflate and deploy later than the rear seat side impact chambers 40, and the lower end portions 46A thereof become retained, from the cabin interior side, on the door beltline portions 68 of the side doors 32 of the rear seats RS. Because of this, the curtain airbags 14 maintain their deployed state for a long time.

On the other hand, at the time of a frontal impact including at the time of a small overlap impact and at the time of an oblique impact, the fact that the host vehicle has sustained a frontal impact is, along with the impact type, detected on the basis of detection information from the frontal impact detection sensor 82 and image information from the on-board camera 84. Because of this, an inflator of a driver's seat airbag device (not shown in the drawings) and an inflator of a front passenger seat airbag device (not shown in the drawings) are activated by the ECU 80, and the inflator 12 of the vehicle curtain airbag device 10 is also activated. When the inflator 12 of the vehicle curtain airbag device 10 is activated, the curtain airbag 14 becomes inflated and deployed, by the gas discharged from the gas discharge holes 28 in the inflator 12 as mentioned above, in the shape of a curtain in the vehicle downward direction from the vehicle width direction outer end portion 20A of the roof headlining 20. As a result, the front seat side impact chamber 38 becomes disposed on the vehicle width direction outer side of the head of the front seat occupant P1, and the rear seat side impact chamber 40 becomes disposed on the vehicle width direction outer side of the head of the rear seat occupant P2.

Figure 3A:
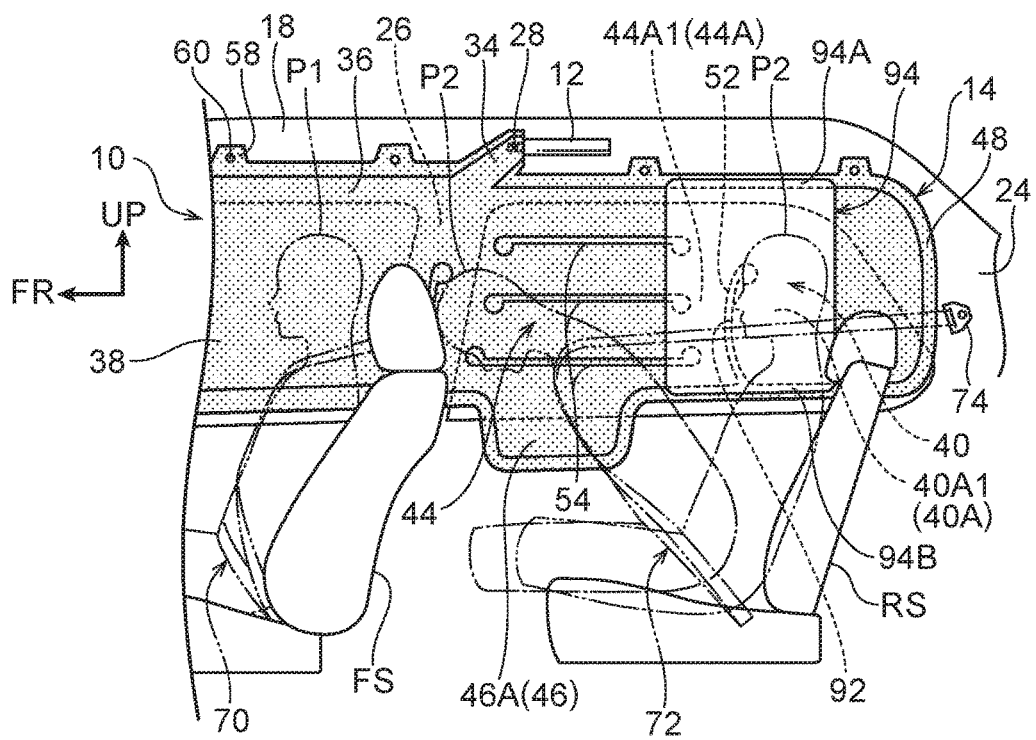
FIG. 3A is a side view showing a state in which a rear seat occupant has moved due to inertia in the vehicle forward direction in the activated state of the vehicle curtain airbag device shown in FIG. 1.
Figure 3B:
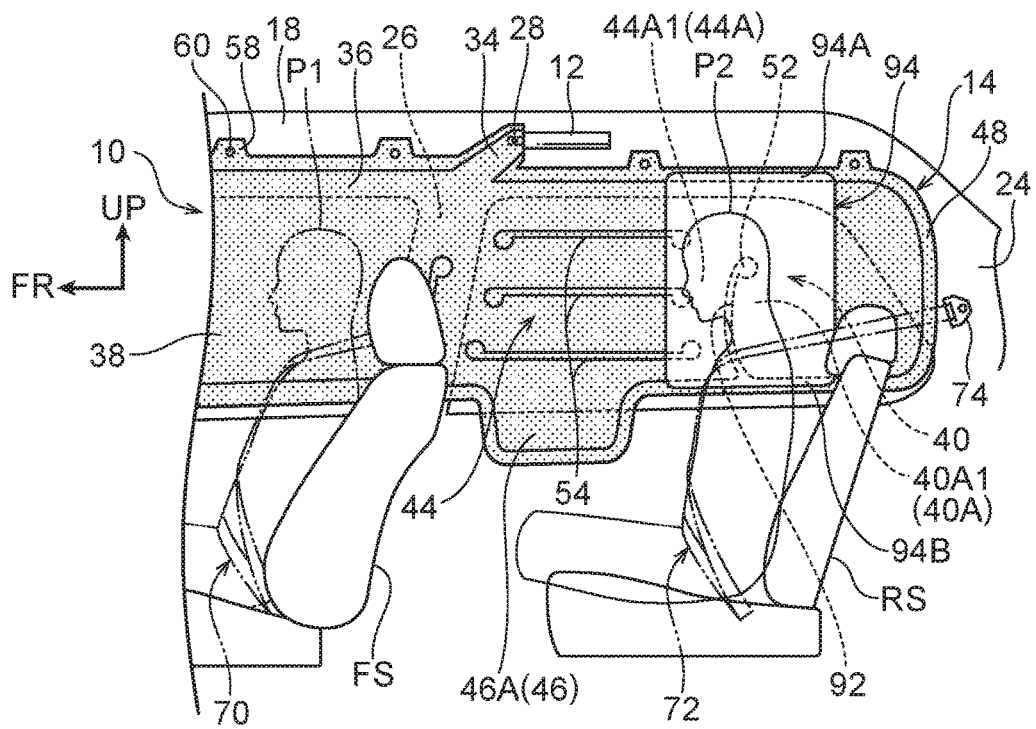
FIG. 3B is a side view showing a state in which the rebounding head of the rear seat occupant has come into abutting contact with the protective cloth.

In this connection, at the time of a small overlap impact or at the time of an oblique impact, as shown in FIG. 3A and FIG. 4A, the head of the rear seat occupant P2 on the impact side moves due to inertia in the vehicle forward direction and outward in the vehicle width direction. That is, the head of the rear seat occupant P2 moves due to inertia from the position indicated by the long dashed double-dotted line in the drawings to the position indicated by the long dashed single-dotted line in the drawings. Here, the upper body of the rear seat occupant P2 is restrained by the three-point seat belt device 72 for the rear seat. For that reason, as shown in FIG. 3B and FIG. 4B, the head of the rear seat occupant P2 that has moved due to inertia to the position indicated by the long dashed single-dotted line in the drawings sometimes rebounds toward the front portion 40A side of the rear seat side impact chamber 40. That is, the head of the rear seat occupant P2 sometimes moves in the vehicle rearward direction and outward in the vehicle width direction from the position indicated by the long dashed single-dotted line indicated in the drawings to the position indicated by the solid line in the drawings. This tendency exists particularly in a case where the shoulder anchor 74 of the three-point seat belt device 72 for the rear seat is installed in the rear pillar 24.

Figure 5A:
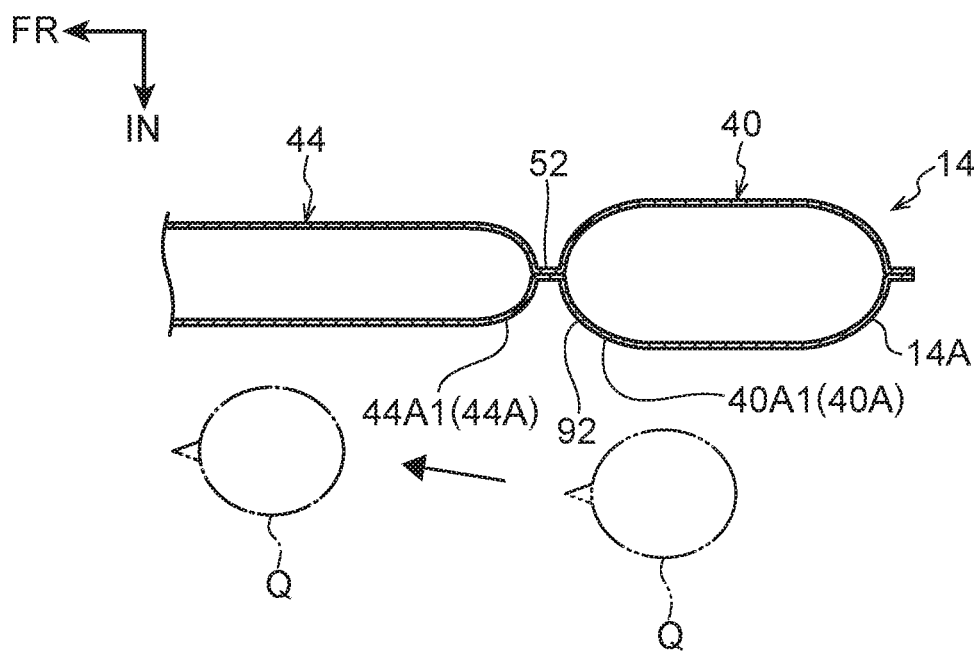
FIG. 5A is a plan sectional view showing a state in which a rear seat occupant has moved due to inertia in the vehicle forward direction in a state in which a vehicle curtain airbag device pertaining to a contrasting example not equipped with the protective cloth has been activated.
Figure 5B:
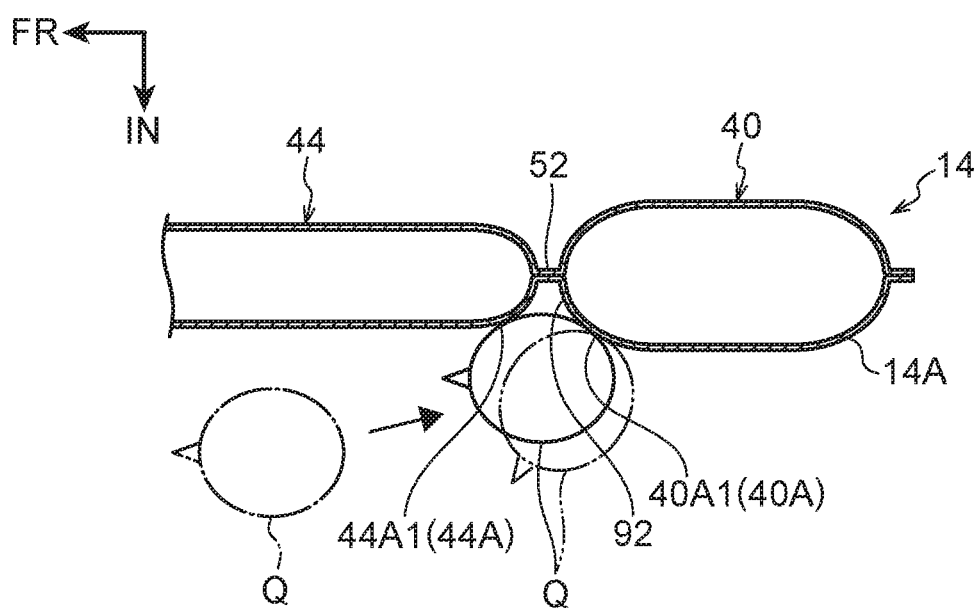
FIG. 5B is a plan sectional view showing the head of the rear seat occupant rebounding from the state in FIG. 5A, coming into contact with the recess portion between the rear seat side impact chamber and the front chamber, and turning about an axis in the vehicle up and down direction.

Here, in the curtain airbag 14, the front chamber 44 is disposed on the vehicle front side of the rear seat side impact chamber 40 with the third non-inflating portion 52 being interposed in between, and the thickness B1 of the front chamber 44 measured inward in the vehicle width direction from the third non-inflating portion 52 in the completely deployed state of the curtain airbag 14 is thinner than the thickness B2 of the rear seat side impact chamber 40 measured inward in the vehicle width direction from the third non-inflating portion 52. For this reason, in the completely deployed state of the curtain airbag 14, the recess portion 92 having different heights in the bag thickness direction is formed between the front portion 40A of the rear seat side impact chamber 40 and the rear portion 44A of the front chamber 44. Consequently, if, as shown in FIG. 5A and FIG. 5B, the protective cloth 94 of the present embodiment is not provided, it is conceivable for a rebounding head of a rear seat occupant Q to get caught in the recess portion 92. In this case, the head of the rear seat occupant Q tends to move in the vehicle rearward direction even at the point in time when it has gotten caught in the recess portion 92, so as shown in FIG. 5B, there is the potential for the head of the rear seat occupant Q to be suddenly turned about an axis in the vehicle up and down direction. That is, there is the potential for the head of the rear seat occupant Q indicated by the solid line in FIG. 5B to be suddenly turned about an axis in the vehicle up and down direction as indicated by the long dashed double-dotted line.

In light of this knowledge, in the present embodiment, the protective cloth 94 configured separately from the curtain airbag 14 is anchored by sewing to at least the upper edge side (in the present embodiment, the first non-inflating portion 48 positioned on the upper edge side and the first non-inflating portion 48 positioned on the lower edge side) of the rear seat side impact chamber 40 of the curtain airbag 14. In the completely deployed state of the curtain airbag 14 the protective cloth 94 is disposed ranging from the surface 40A1 of the front portion 40 of the rear seat side impact chamber 40 to the surface 44A1 of the rear portion 44A of the front chamber 44 and covers, from the vehicle width direction inner side, the (entire) recess portion 92 having different heights in the bag thickness direction and formed between the front portion 40A of the rear seat side impact chamber 40 and the rear portion 44A of the front chamber 44. For this reason, in the region where the protective cloth 94 is provided, (seemingly) the recess portion 92 having different heights disappears. Moreover, because the thickness B1 of the front chamber 44 measured inward in the vehicle width direction from the third non-inflating portion 52 in the completely deployed state is thinner than the thickness B2 of the rear seat side impact chamber 40 measured inward in the vehicle width direction from the third non-inflating portion 52, as shown in FIG. 4A, when seen in a vehicle plan view the protective cloth 94 is disposed sloping outward in the vehicle width direction from the front portion 40A of the rear seat side impact chamber 40 to the rear portion 44A of the front chamber 44. As a result, the rebounding head of the rear seat occupant P2 comes into abutting contact not with the recess portion 92 but with the protective cloth 94, and it becomes difficult for the head to get caught in the recess portion 92. It will be noted that the head of the rear seat occupant P2 that has come into abutting contact with the protective cloth 94 slides in the vehicle rearward direction together with the protective cloth 94.

As described above, the vehicle curtain airbag device 10 pertaining to the present embodiment can, at the time of a frontal impact including at least at the time of a small overlap impact and at the time of an oblique impact, restrain or prevent the head of the rear seat occupant P2 from suddenly turning about an axis in the vehicle up and down direction when the rebounding head of the rear seat occupant P2 comes into abutting contact with the recess portion 92 having different heights in the bag thickness direction and formed between the front portion 40A of the rear seat side impact chamber 40 and the rear portion 44A of the front chamber 44 (hereinafter this effect will sometimes be called the "main effect").

Furthermore, in the present embodiment, the out-of-plane stiffness of the protective cloth 94 is set higher than that of the base cloth 14A configuring the curtain airbag 14, so it is difficult for the protective cloth 94 to roll up and the recess portion 92 is tightly covered by the protective cloth 94. For this reason, it is difficult for the protective cloth 94 to become sunken when the rebounding head of the rear seat occupant P2 comes into abutting contact with the protective cloth 94, and it becomes even more difficult for the rebounding head of the rear seat occupant P2 to get caught in the recess portion 92. Moreover, because the out-of-plane stiffness of the protective cloth 94 is set high, the protective cloth 94 has high reliability in terms of ensuring that the rebounding head of the rear seat occupant P2 does not get caught in the recess portion 92. Thus, according to the present embodiment, the rebounding head of the rear seat occupant P2 can be effectively restrained or prevented from getting caught in the recess portion 92, and therefore reliability with respect to restraining or preventing the rebounding head of the rear seat occupant P2 from suddenly turning about an axis in the vehicle up and down direction can be enhanced (hereinafter this effect will sometimes be called the "effect of the high out-of-plane stiffness cloth").

Moreover, in the present embodiment, the protective cloth 94 is anchored to the lower edge side in addition to the upper edge side of the curtain airbag 14, so the protective cloth 94 is reliably unfolded when the rear seat side impact chamber 40 inflates and deploys, and it becomes difficult for the bottom of the protective cloth 94 to roll up when the rebounding head of the rear seat occupant P2 contacts the protective cloth 94. As a result, according to the present embodiment, the occurrence of deployment (unfolding) problems with the protective cloth 94 and the occurrence of rolling-up of the protective cloth 94 can be restrained or prevented, and the rebounding head of the rear seat occupant P2 can be reliably brought into contact with the protective cloth 94 (hereinafter this effect will sometimes be called the "rolling-up prevention effect").

Second Embodiment

Next, a second embodiment of the vehicle curtain airbag device pertaining to the invention will be described using FIG. 6. It will be noted that mainly the relevant portions will be described, and regarding constituent parts that are substantially the same as those in the embodiment already described (here, the first embodiment), the same numbers will be assigned thereto and description thereof will be omitted. The same will also hold true in a third and subsequent embodiments described later.

Figure 6:
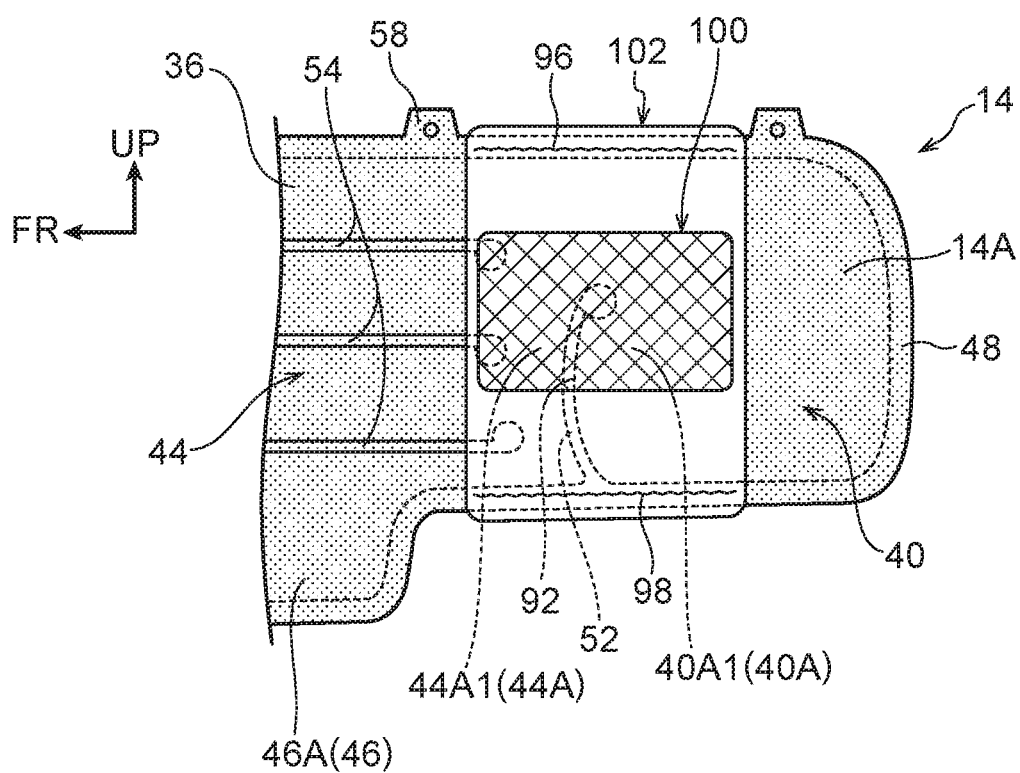
FIG. 6 is a side view, corresponding to FIG. 2A, showing the curtain airbag and a protective cloth that are main portions of a second embodiment.

As shown in FIG. 6, the second embodiment is characterized in that a protective cloth 100 is partially disposed in the up and down direction central region of the curtain airbag 14 with which the head of the rear seat occupant P2 comes into abutting contact. It will be noted that this means that, although FIG. 3B used in the first embodiment depicts a state in which the rear seat occupant P2 has come into abutting contact with the protective cloth 94, the protective cloth 100 is disposed in the central region of the curtain airbag 14 in a case where the region that covers the recess portion 92 from the vehicle width direction inner side is divided into three regions comprising an upper region, a central region, and a lower region. The protective cloth 100 is formed in a rectangular shape whose long-side direction coincides with the vehicle front and rear direction, and the dimension of the protective cloth 100 in the vehicle up and down direction is shorter than that of the protective cloth 94 of the first embodiment. Furthermore, except for its shape and size the protective cloth 100 has the same configuration as that of the protective cloth 94 described in the first embodiment. That is to say, the protective cloth 100 is, like the protective cloth 94, a thick cloth whose out-of-plane stiffness is high.

The protective cloth 100 is anchored to an under cloth 102 that is thinner than the protective cloth 100. The under cloth 102 has an up and down direction dimension extending from the upper edge portion to the lower edge portion of the curtain airbag 14, and the under cloth 102 is formed in a rectangular shape as seen from the cabin interior. The entire protective cloth 100 lies on top of the under cloth 102. Additionally, a predetermined location (e.g., the outer peripheral four sides) of the protective cloth 100 is anchored to the under cloth 102 by sewing. The under cloth 102 is thinner than the thickness of the protective cloth 100, and its out-of-plane stiffness is lower than that of the protective cloth 100. As the under cloth 102, for example, the same raw material as that of the base cloth 14A of the curtain airbag 14 can be used.

The upper edge portion of the under cloth 102 is anchored by sewing to the upper edge portion of the first non-inflating portion 48 of the curtain airbag 14 (to thereby form the first anchored portion 96). Similarly, the lower edge portion of the under cloth 102 is anchored by sewing to the lower edge portion of the first non-inflating portion 48 of the curtain airbag 14 (to thereby form the second anchored portion 98). That is to say, the under cloth 102 functions as an anchoring member for anchoring to the curtain airbag 14 the protective cloth 100 that is smaller in size and disposed only in the up and down direction central region of the region that covers the recess portion 92 from the vehicle width direction inner side.

(Action and Effects)

According to this configuration also, the rebounding head of the rear seat occupant P2 comes into abutting contact with the protective cloth 100 whose out-of-plane stiffness is high, so the main effect, the effect of the high out-of-plane stiffness cloth, and the rolling-up prevention effect of the first embodiment are obtained.

Furthermore, in the present embodiment, the protective cloth 100 is partially disposed in the up and down direction central region of the curtain airbag 14 with which the head of the rear seat occupant P2 comes into abutting contact, so the area of the protective cloth 100 becomes smaller compared to a case where the protective cloth 100 is entirely disposed from the upper edge portion to the lower edge portion of the curtain airbag 14.

For this reason, the package does not become bulky when the protective cloth 100 is folded up together with the curtain airbag 14. As a result, the package size of the vehicle curtain airbag device 10 can be reduced (hereinafter this effect will sometimes be called the "partial cloth effect").

Third Embodiment

Next, a third embodiment of the vehicle curtain airbag device pertaining to the invention will be described using FIG. 7.

Figure 7:
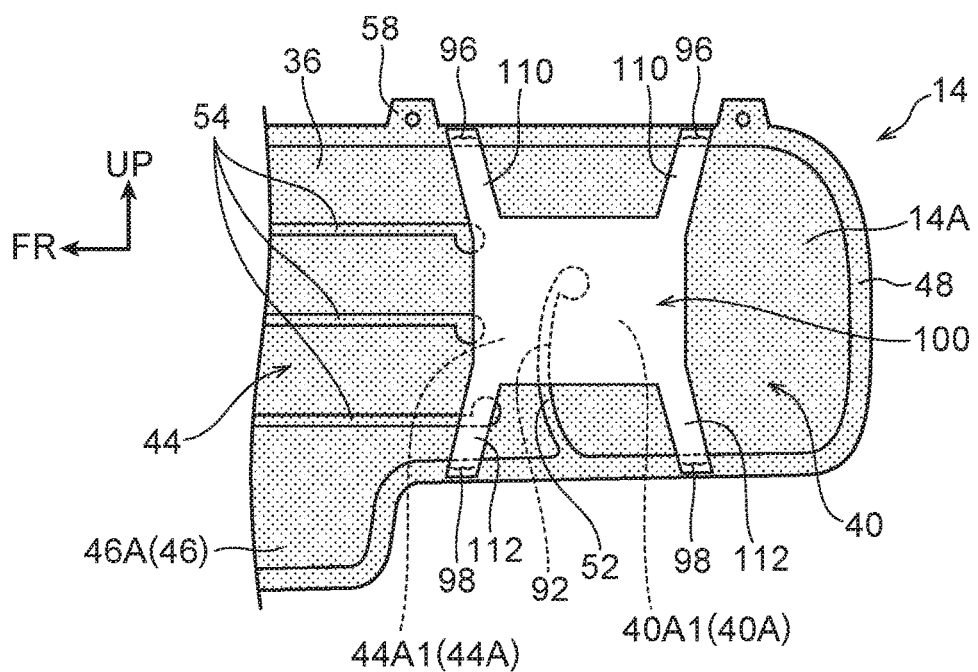
FIG. 7 is a side view, corresponding to FIG. 2A, showing the curtain airbag and a protective cloth that are main portions of a third embodiment.

As shown in FIG. 7, the third embodiment is characterized in that the protective cloth 100 partially disposed in the up and down direction central region of the curtain airbag 14 with which the head of the rear seat occupant P2 comes into abutting contact is anchored to the upper edge portion and the lower edge portion of the curtain airbag 14 by plural first straps 110 and plural second straps 112.

Specifically, two first straps 110 are provided integrally with the protective cloth 100 on the front and rear end portions of the upper edge side of the protective cloth 100. Similarly, two straps 112 are also provided integrally with the protective cloth 100 on the front and rear end portions of the lower edge side of the protective cloth 100. That is to say, in this embodiment, the shape of the protective cloth 100 itself is a shape including the first straps 110 and the second straps 120. However, this configuration is not invariably necessary, and a configuration may also be adopted where the first straps and the second straps are configured separately from the protective cloth 100 and where the one end portions of the first straps and the one end portions of the second straps are anchored by sewing, for example, to the upper edge side and the lower edge side of the protective cloth 100.

The other end portions of the first straps 110 are anchored by sewing to the upper edge portion of the curtain airbag 14 (that is, the upper edge portion of the first non-inflating portion 48) and further forward and rearward in the vehicle forward and rearward direction than the upper edge of the protective cloth 100. Similarly, the other end portions of the second straps 112 are anchored by sewing to the lower edge portion of the curtain airbag 14 (that is, the lower edge portion of the first non-inflating portion 48) and further forward and rearward in the vehicle forward and rearward direction than the lower edge of the protective cloth 100.

(Action and Effects)

According to this configuration also, the rebounding head of the rear seat occupant P2 comes into abutting contact with the protective cloth 100 whose out-of-plane stiffness is high, so the main effect, the effect of the high out-of-plane stiffness cloth, and the rolling-up prevention effect are obtained as in the first embodiment. Furthermore, the protective cloth 100 is partially disposed in just the up and down direction central region of the curtain airbag 14, so the partial cloth effect is obtained as in the second embodiment.

Furthermore, in the present embodiment, the protective cloth 100 whose area is small is anchored to the curtain airbag 14 by strap-like narrow cloths comprising the first straps 110 and the second straps 112, so the package size can be reduced more than in the second embodiment (hereinafter this effect will sometimes be called the "package size effect").

Moreover, compared to a configuration where the upper edge portion and the lower edge portion of the protective cloth 94 whose area is large are anchored across their entire lengths as in the first embodiment, the force with which the protective cloth 100 is restrained to the curtain airbag 14 becomes weaker. For this reason, it becomes easier for the protective cloth 100 itself to slide (move) in the vehicle rearward direction together with the rebounding head of the rear seat occupant P2. As a result, according to the present embodiment, the rebounding head of the rear seat occupant P2 can be restrained or prevented even more from turning about an axis in the vehicle up and down direction (hereinafter this effect will sometimes be called the "sliding ease effect", and the package size effect and the sliding ease effect will sometimes be called the "strap effect").

Moreover, the other end portions of the first straps 110 and the other end portions of the second straps 112 are sewn and anchored to the curtain airbag 14, so compared to the first embodiment and the second embodiment the amount of sewing can be reduced. Consequently, a reduction in cost can be achieved.

Next, some example modifications of the third embodiment will be described.

First Example Modification

Figure 8A:
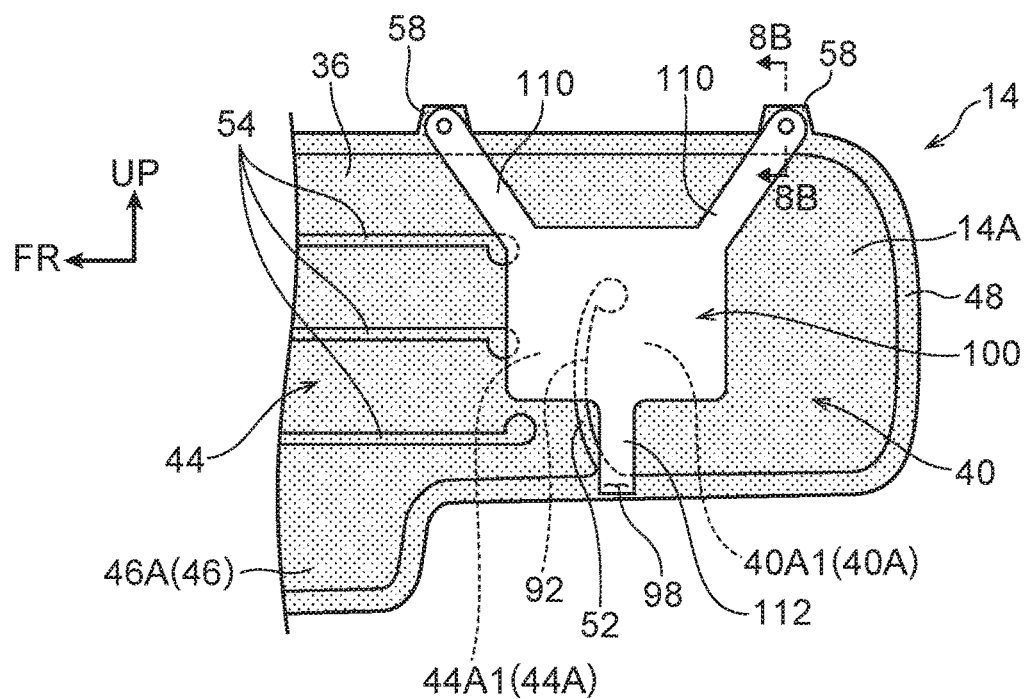
FIG. 8A is a side view, corresponding to FIG. 7, showing a first example modification of the third embodiment.

As shown in FIG. 8A, in a first example modification, the vehicle front and rear direction middle portion of the lower edge portion of the protective cloth 100 and the lower edge portion of the curtain airbag 14 are coupled to each other in the vehicle up and down direction by one second strap 112. Furthermore, the other end portions of the two first straps 110 are not anchored by sewing to the upper edge portion of the curtain airbag 14 but are laid on top of the two anchoring tabs 58 of the curtain airbag 14 and are fastened together with the anchoring tabs 58 to the roof side rail 18 using the anchors 60.

Figure 8B:
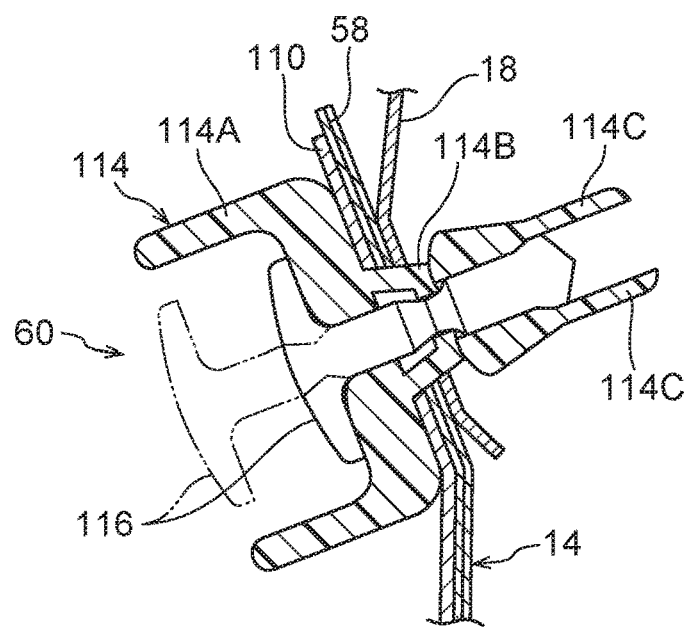
FIG. 8B is an enlarged sectional view showing an anchoring structure of the other end portion of a first strap and an anchoring tab shown in FIG. 8A.

As shown in FIG. 8B, each anchor 60 is configured by a clip portion 114 made of resin and an anchor pin 116 made of metal. The clip portion 114 is configured to include a recess-shaped clip seat 114A, a truncated cone-shaped insertion portion 114B that projects from the axial center portion of the clip seat 114A, and a retaining portion 114C provided on the distal end of the insertion portion 114B in such a way that its diameter is enlargeable. By inserting the anchor pins 116 into the axial center portions of the clip seats 114A and causing the diameters of the retaining portions 114C to enlarge, the anchoring tabs 58 of the curtain airbag 14 and the other end portions of the first straps 110 are together fastened to the roof side rail (inner member) 18.

According to this configuration also, the vehicle curtain airbag device is equipped with the protective cloth 100, the first straps 110, and the second strap 112, so the same action and effects as in the third embodiment are obtained. Furthermore, the other end portions of the first straps 110 are fastened together with the anchoring tabs 58 of the curtain airbag 14 to the roof side rail 18, so the number of sewing locations can be reduced, and in correspondence thereto a reduction in cost can be achieved.

Second Example Modification

Figure 9A:
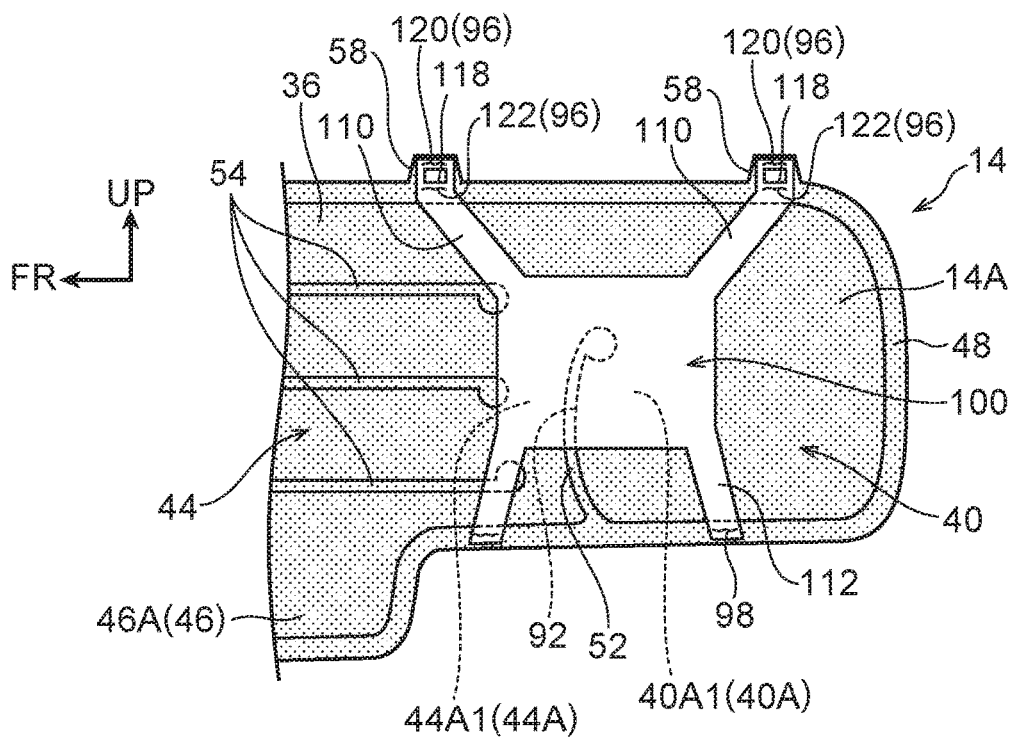
FIG. 9A is a side view, corresponding to FIG. 7, showing a second example modification of the third embodiment.
Figure 9B:
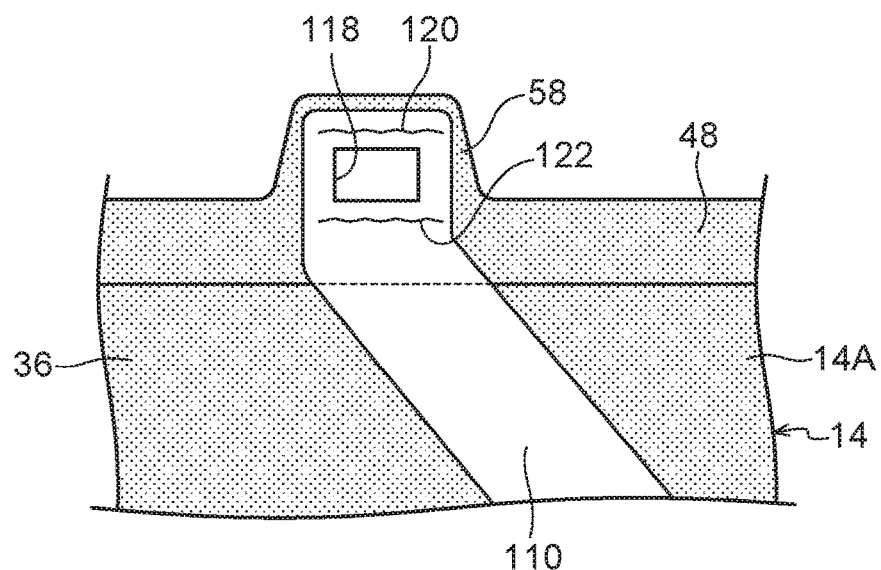
FIG. 9B is an enlarged side view showing the other end portion of a first strap and an anchoring tab shown in FIG. 9A.

A second example modification can be said to be an example modification of the first example modification. That is, in the first example modification, the other end portions of the first straps 110 are laid on top of the anchoring tabs 58 of the curtain airbag 14 and are fastened and anchored thereto by the anchors 60. However, the first example modification is not limited to this, and as shown in FIG. 9A and FIG. 9B the other end portions of the first straps 110 may also be sewn beforehand to the anchoring tabs 58.

Specifically, the other end portions of the first straps 110 are formed in rectangular shapes, and in the central portions thereof are formed rectangular openings 118 for allowing the shaft portions of the anchors 60 to pass through. Additionally, the other end portions of the first straps 110 are sewn in two places above and below the openings 118 to thereby anchor the other end portions to the anchoring tabs 58. That is, sewing is done parallel to the upper edges of the openings 118 to form first seams 120. Furthermore, sewing is done parallel to the lower edges of the openings 118 to form second seams 122.

According to this configuration also, the same action and effects as in the third embodiment and the first example modification are obtained. Furthermore, because the other end portions of the first straps 110 are laid on top of the anchoring tabs 58, and then the other end portions of the first straps 110 and the anchoring tabs 58 are sewn to each other beforehand at the first seams 120 and the second seams 122, the thickness of the anchoring tabs 58 becomes substantially thicker and an effect of reinforcing, with the other end portions of the first straps 110, the anchoring tabs 58, which are sites anchored by the anchors 60, is obtained. As a result, compared to a configuration where the anchoring tabs 58 are reinforced by sewing separate reinforcement cloths different from the other end portions of the first straps 110, a reduction in cost can be achieved.

Fourth Embodiment

Next, a fourth embodiment of the vehicle curtain airbag device pertaining to the invention will be described using FIG. 10.

Figure 10:
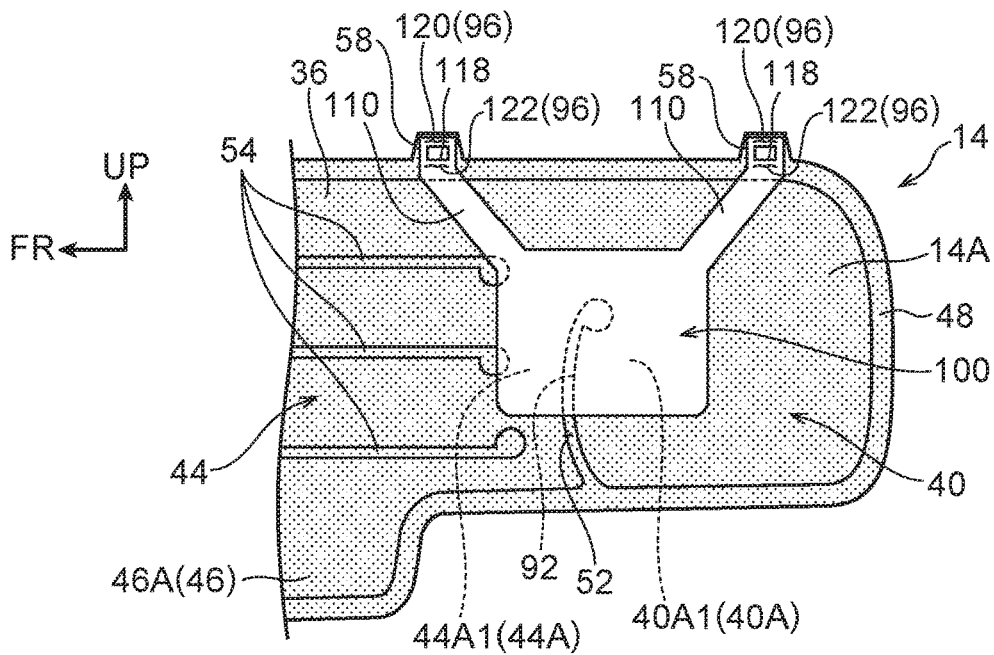
FIG. 10 is a side view, corresponding to FIG. 9A, showing the curtain airbag and the protective cloth that are main portions of a fourth embodiment.

As shown in FIG. 10, the fourth embodiment is characterized in that, with respect to the configuration of the second example modification (FIG. 9A) of the third embodiment, the protective cloth 100 is anchored to the outer peripheral upper edge portion of the curtain airbag 14 (the upper edge portion of the first non-inflating portion 48) using only the first straps 110. That is, in this fourth embodiment, the second straps 112 are not provided.

(Action and Effects)

According to this configuration also, the rebounding head of the rear seat occupant P2 comes into abutting contact with the protective cloth 100 whose out-of-plane stiffness is high, so the main effect and the effect of the high out-of-plane stiffness cloth are obtained as in the first embodiment. Furthermore, the protective cloth 100 is partially disposed in just the up and down direction central region of the curtain airbag 14, so the partial cloth effect is obtained as in the second embodiment. Moreover, the protective cloth 100 is anchored to the upper edge portion of the first non-inflating portion 48 of the curtain airbag 14 using the first straps 110, so the strap effect is obtained as in the third embodiment.

Furthermore, in the present embodiment, the package size can be reduced more than in the third embodiment in correspondence to the second straps 112 not being provided. Moreover, the lower portion side of the protective cloth 100 becomes unrestrained to the curtain airbag 14 in correspondence to the second straps 112 not being provided. For this reason, it becomes easier particularly for the lower portion side of the protective cloth 100 to slide in the vehicle rearward direction (hereinafter this effect will sometimes be called the "unrestrained protective cloth effect").

Fifth Embodiment

Next, a fifth embodiment of the vehicle curtain airbag device pertaining to the invention will be described using FIG. 11.

Figure 11:
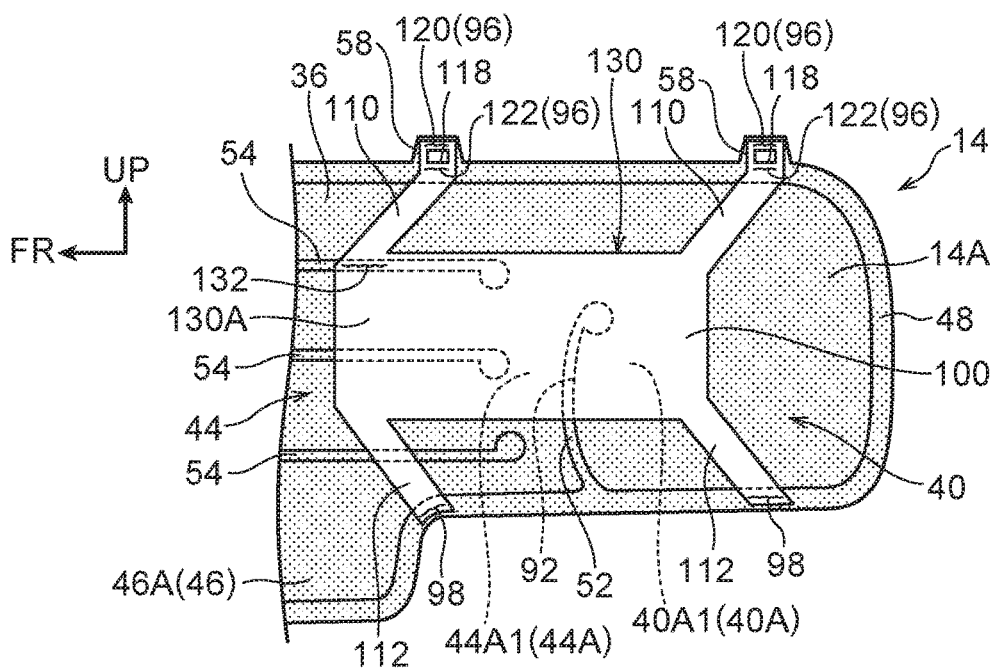
FIG. 11 is a side view, corresponding to FIG. 9A, showing the curtain airbag and the protective cloth that are main portions of a fifth embodiment.

As shown in FIG. 11, the fifth embodiment has the same configuration as that of the second example modification (FIG. 9A) of the third embodiment in that a protective cloth 130 is anchored to the outer peripheral upper edge portion of the curtain airbag 14 (the upper edge portion of the first non-inflating portion 48) and the outer peripheral lower edge portion of the curtain airbag 14 (the lower edge portion of the first non-inflating portion 48) using both the first straps 110 and the second straps 112. However, the fifth embodiment differs from the second example modification (FIG. 9A) of the third embodiment in that the positions at which the other end portions of the first straps 110 are anchored and the positions at which the other end portions of the second straps 112 are anchored are offset in the vehicle rearward direction, and it is this which characterizes the fifth embodiment.

The positions at which the other end portions of the first straps 110 are anchored to the curtain airbag 14 are disposed offset a predetermined distance in the vehicle rearward direction with respect to the positions at which the one end portions of the first straps 110 are connected to the protective cloth 130. Similarly, the positions at which the other end portions of the second straps 112 are anchored to the curtain airbag 14 are disposed offset the same distance as the predetermined distance in the vehicle rearward direction with respect to the positions at which the one end portions of the second straps 112 are connected to the protective cloth 130. Consequently, the two first straps 110 are disposed parallel to each other, and the two second straps 112 are disposed parallel to each other. Furthermore, the angle formed by the first strap 110 on the front side and the upper edge of the protective cloth 130 is the same as the angle formed by the second strap 112 on the front side and the lower edge of the protective cloth 130.

Furthermore, the protective cloth 130 extends further in the vehicle forward direction than, for example, the protective cloth 100 in the second example modification of the third embodiment, and an extension portion 130A forming the extended portion of the protective cloth 130 is temporarily fastened by a tear seam 132 to the uppermost fourth non-inflating portion 54. Because of this, the protective cloth 130 is held in the position shown in FIG. 11 until the rebounding head of the rear seat occupant P2 comes into abutting contact with the protective cloth 130.

(Action and Effects)

According to this configuration also, the rebounding head of the rear seat occupant P2 comes into abutting contact with the protective cloth 130 whose out-of-plane stiffness is high, so the main effect, the effect of the high out-of-plane stiffness cloth, and the rolling-up prevention effect are obtained as in the first embodiment. Furthermore, the protective cloth 130 is partially disposed in just the up and down direction central region of the curtain airbag 14, so the partial cloth effect is obtained as in the second embodiment. Moreover, the protective cloth 130 is anchored by the first straps 110 to the upper edge portion of the first non-inflating portion 48 of the curtain airbag 14 and is anchored by the second straps 112 to the lower edge portion of the first non-inflating portion 48 of the curtain airbag 14, so the strap effect is obtained as in the third embodiment.

Furthermore, in the present embodiment, the positions at which the first straps 110 and the second straps 112 are anchored to the curtain airbag 14 are disposed offset in the vehicle rearward direction with respect to the positions at which the first straps 110 and the second straps 112 are connected to the protective cloth 130, so the first straps 110 and the second straps 112 have extra lengths. For this reason, when the rebounding head of the rear seat occupant P2 comes into abutting contact with the protective cloth 130, the protective cloth 130 can easily move in the vehicle rearward direction after the tear seam 132 for temporary fastening tears. As a result, according to the present embodiment, the ability of the protective cloth 130 to follow the movement of the rebounding head of the rear seat occupant P2 in the vehicle rearward direction is good and the head can be effectively restrained or prevented from turning about an axis in the vehicle up and down direction. Another way of looking at this is that, after the tear seam 132 tears, the protective cloth 130 becomes sandwiched between the rebounding head of the rear seat occupant P2 and the rear seat side impact chamber 40, so the first straps 110 and the second straps 112 both become slack and the protective cloth 130 temporarily enters a state that is the same as a state in which the protective cloth 130 is not restrained to the curtain airbag 14. Consequently, in that sense the present embodiment and the fourth embodiment can be understood as having something in common.

It will be noted that it is not invariably necessary for the two first straps 110 to be parallel to each other and for the two second first straps 112 to be parallel to each other. Even in a case where they are not parallel to each other, a corresponding effect is obtained.

Sixth Embodiment

Next, a sixth embodiment of the vehicle curtain airbag device pertaining to the invention will be described using FIG. 12 and FIG. 13.

Figure 12:
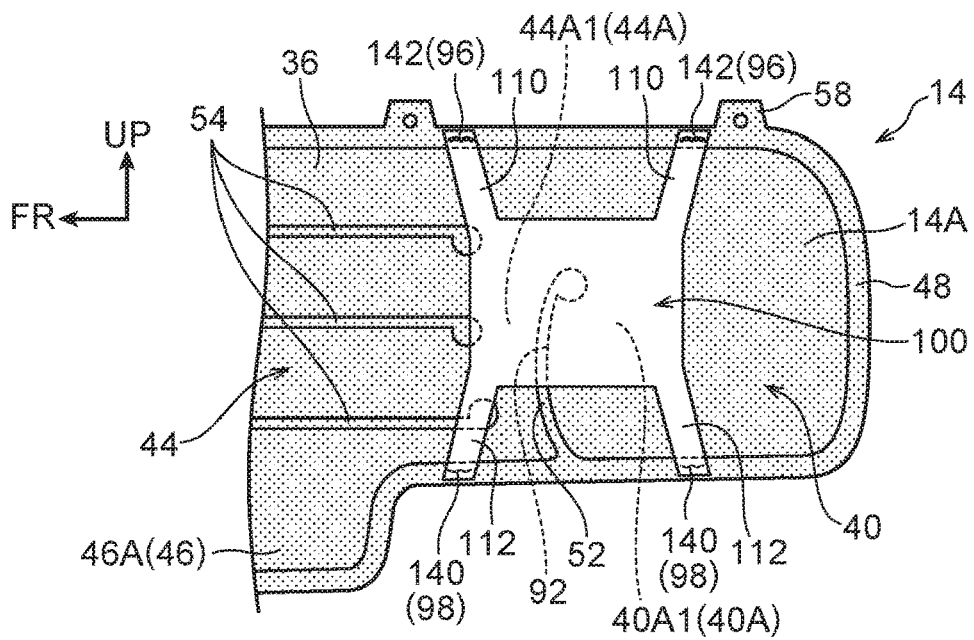
FIG. 12 is a side view, corresponding to FIG. 7, showing the curtain airbag and the protective cloth that are main portions of a sixth embodiment.
Figure 13:
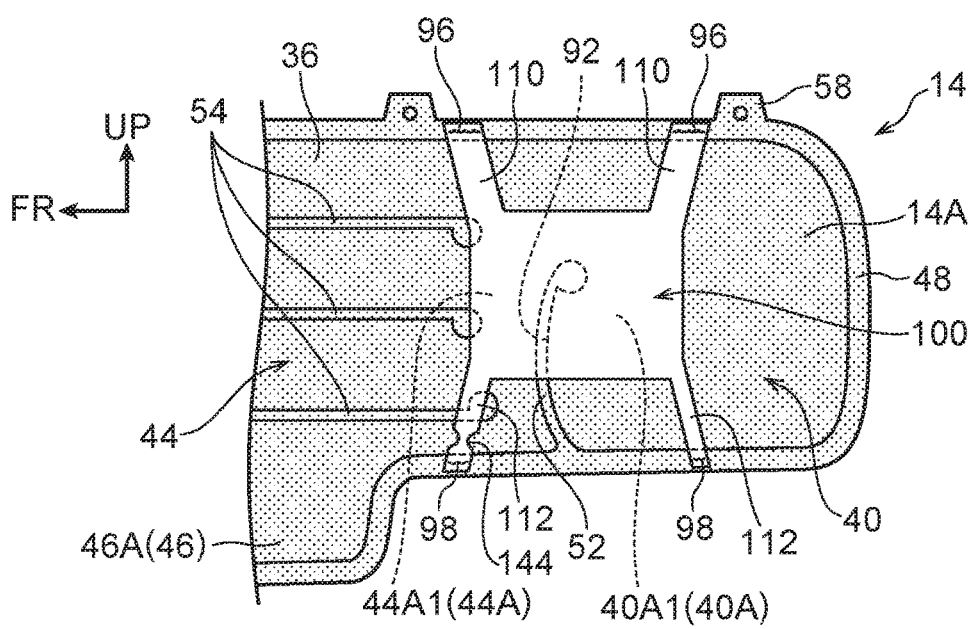
FIG. 13 is a side view, corresponding to FIG. 7, showing the curtain airbag and the protective cloth that are main portions of an example modification of the sixth embodiment.

As shown in FIG. 12, in the sixth embodiment, the basic configurations of the curtain airbag 14 and the protective cloth 100 are the same as those in the third embodiment (FIG. 7). However, the strength of second sewing threads 140 that anchor the other end portions of the second straps 112 to the lower edge portion of the first non-inflating portion 48 of the curtain airbag 14 is lower than the strength of first sewing threads 142 that anchor the other end portions of the first straps 110 to the upper edge portion of the first non-inflating portion 48, and it is this which characterizes the present embodiment. It will be noted that in FIG. 12 the difference between the strengths of the first sewing threads 142 and the second sewing threads 140 is expressed by using bold lines to indicate the first sewing threads 142 and using fine lines to indicate the second sewing threads 140. Furthermore, as the second sewing threads 140, threads having a strength such that the threads break when, after the rebounding head of the rear seat occupant P2 comes into abutting contact with the protective cloth 100, the head slides together with the protective cloth 100 in the vehicle rearward direction are used.

(Action and Effects)

According to this configuration also, the rebounding head of the rear seat occupant P2 comes into contact with the protective cloth 100 whose out-of-plane stiffness is high, so the main effect, the effect of the high out-of-plane stiffness cloth, and the rolling-up prevention effect are obtained as in the first embodiment. Furthermore, the protective cloth 100 is partially disposed in just the up and down direction central region of the curtain airbag 14, so the partial cloth effect is obtained as in the second embodiment. Moreover, the protective cloth 100 is anchored by the first straps 110 to the upper edge portion of the first non-inflating portion 48 of the curtain airbag 14 and is anchored by the second straps 112 to the lower edge portion of the first non-inflating portion 48 of the curtain airbag 14, so the strap effect is obtained as in the third embodiment.

Furthermore, in the present embodiment, the second sewing threads 140 break when, after the rebounding head of the rear seat occupant P2 comes into abutting contact with the protective cloth 100, the head slides together with the protective cloth 100 in the vehicle rearward direction, so it becomes easier for the head to move together with the protective cloth 100 in the vehicle rearward direction. It will be noted that after the second sewing threads 140 break, the configuration of the sixth embodiment becomes functionally identical to the configuration of the fourth embodiment.

Consequently, in the present embodiment also, the unrestrained protective cloth effect is obtained as in the fourth embodiment.

In this way, in the present embodiment, a balance can be achieved between preventing the protective cloth 100 from rolling up so as to reliably bring the rebounding head of the rear seat occupant P2 into contact with the protective cloth 100 and restraining or preventing the head from turning by making it easier for the head to slide together with the protective cloth 100 in the vehicle rearward direction after the head comes into abutting contact with the protective cloth 100.

It will be noted that although in the present embodiment the second sewing threads 140 that anchor the other end portions of the second straps 112 to the lower edge portion of the curtain airbag 14 are configured to break, the vehicle curtain airbag device pertaining to the sixth embodiment is not limited to this. As shown in FIG. 13, the vehicle curtain airbag device pertaining to the sixth embodiment may also be configured in such a way that the other end portions themselves of the second straps 112 are sewn by the first sewing threads 142 to the lower edge portion of the curtain airbag 14, a narrow portion 144 is formed in the neighborhood of the other end portion of the second strap 112 disposed on the vehicle front side, and that second strap 112 becomes torn at this narrow portion 144. When the vehicle curtain airbag device is configured in this way also, the same effects as those in the example shown in FIG. 12 are obtained. It will be noted that the narrow portion 144 may be set not only in the neighborhood of the other end portion of the second strap 112 disposed on the vehicle front side but also in the neighborhood of the other end portion of the second strap 112 disposed on the vehicle rear side. The narrow portion 144 is an element to be understood broadly as a "weak portion" and, when understood to also include a configuration that allows the second sewing threads 140 to break, is an element to be understood in one example as a "anchorage cancelling portion" that cancels the anchorage of the other end portion of the second strap to the curtain airbag 14.

Seventh Embodiment

Next, a seventh embodiment of the vehicle curtain airbag device pertaining to the invention will be described using FIG. 14 and FIG. 15.

Figure 14:
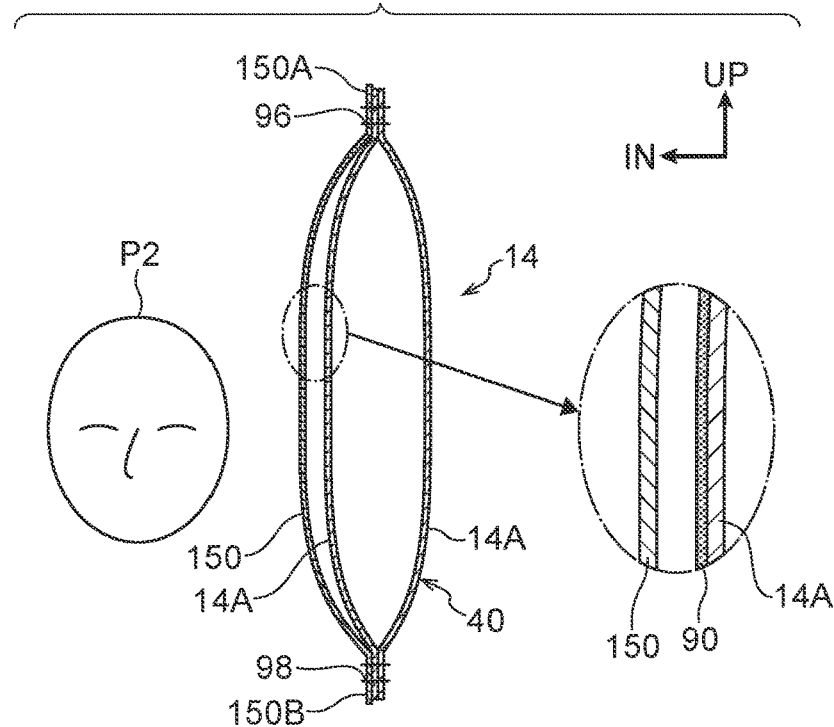
FIG. 14 is a longitudinal sectional view, corresponding to FIG. 2B, showing the curtain airbag and a protective cloth that are main portions of a seventh embodiment.

As shown in FIG. 14, the seventh embodiment is characterized in that a protective cloth 150 configured as a sliding cloth is used instead of the protective cloth 94 of the first embodiment and so forth.

Specifically, as shown in the enlarged appended drawing in FIG. 14, the protective cloth 150 is configured by a single cloth that is of the same material as that of the base cloth 14A of the curtain airbag 14. That is, the protective cloth 150 is configured by a cloth not provided with the coating 90 (uncoated). Consequently, the coefficient of friction of the vehicle width direction outer surface of the protective cloth 150 is lower than the coefficient of friction of the vehicle width direction inner surface (the coating 90) of the rear seat side impact chamber 40 of the curtain airbag 14. As a result, it becomes easier for the protective cloth 150 to slide on the vehicle width direction inner surface (the coating 90) of the rear seat side impact chamber 40.

It will be noted that the protective cloth 150 has the same shape as that of the protective cloth 94 of the first embodiment, and the position where it is disposed is also a range in which the protective cloth 150 covers, from the vehicle width direction inner side, the recess portion 92 having different heights in the bag thickness direction. Furthermore, an upper edge portion 150A of the protective cloth 150 is anchored at the first anchored portion 96 to the upper edge side of the first non-inflating portion 48 of the curtain airbag 14, and a lower edge portion 150B of the protective cloth 150 is anchored at the second anchored portion 98 to the lower edge side of the first non-inflating portion 48 of the curtain airbag 14.

(Action and Effects)

According to this configuration, at the time of a small overlap impact or at the time of an oblique impact, the rebounding head of the rear seat occupant P2 comes into abutting contact with the protective cloth 150 that covers, from the vehicle width direction inner side, the recess portion 92. The protective cloth 150 is configured as a sliding cloth, and the coefficient of friction of the vehicle width direction outer surface of the protective cloth 150 is lower than the coefficient of friction of the coating 90 of the rear seat side impact chamber 40, so the head of the rear seat occupant P2 slides in the vehicle rearward direction together with the protective cloth 150 so as to move the protective cloth 150 in the vehicle rearward direction.

Furthermore, because the coefficient of friction of the vehicle width direction outer surface of the protective cloth 150 is set lower than the coefficient of friction of the vehicle width direction inner surface (the coating 90) of the rear seat side impact chamber 40, it is also possible to make the thickness of the protective cloth 150 itself thinner than the base cloth 14A of the rear seat side impact chamber 40.

As a result, according to the present embodiment, the rebounding head of the rear seat occupant P2 can be effectively restrained or prevented from suddenly turning about an axis in the vehicle up and down direction, and the package does not become bulky (the package size does not increase) when the protective cloth 150 is folded up together with the curtain airbag 14.

It will be noted that although in the present embodiment the same cloth as that of the base cloth 14A of the curtain airbag 14 is used as the protective cloth 150, the protective cloth 150 is not limited to this, and another cloth may also be used. For example, a low-friction cloth including fluorine fiber may also be used as the protective cloth. Examples of low-friction cloth include TOYOFLON (registered trademark) made by Toray Industries, Inc.

Figure 15:
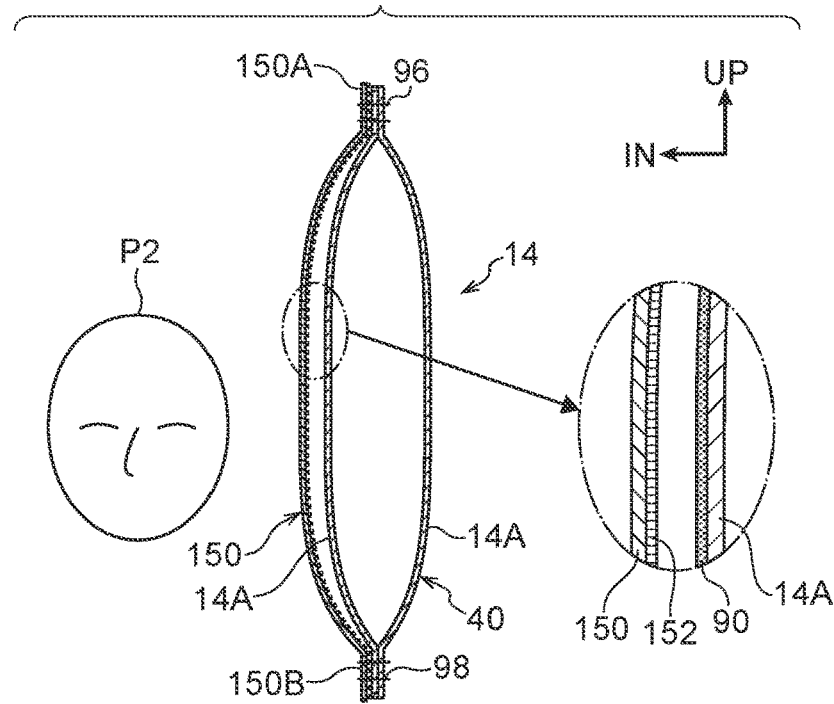
FIG. 15 is a longitudinal sectional view, corresponding to FIG. 2B, showing the curtain airbag and the protective cloth that are main portions of an example modification of a seventh embodiment.

Furthermore, in a case where the protective cloth 150 does not slide with sufficient ease, it is also possible to employ the example modification shown in FIG. 15. In the example modification shown in FIG. 15, a low-friction portion 152 is provided on the vehicle width direction outer surface of the protective cloth 150. The low-friction portion 152 is provided by, for example, applying a low-friction agent whose coefficient of friction is lower than that of the base cloth 14A. As the low-friction agent, for example, talc or the like can be used. The coefficient of friction of the surface of the low-friction portion 152 is, naturally, lower than the coefficient of friction of the coating 90.

It will be noted that the present embodiment, which uses the protective cloth 150 configured as a sliding cloth, may also be applied in combination with any of the first embodiment to the sixth embodiment, which use the protective cloths 94, 100, and 130 configured by high out-of-plane stiffness cloths. For example, the protective cloth 94 used in the first embodiment has its thickness increased by laying on top of each other cloths that are of the same material as that of the base cloth 14A, so comparing just the coefficients of friction, the vehicle width direction inner surface of the protective cloth 94 is lower than the coefficient of friction of the vehicle width direction inner surface of the coating 90. Consequently, at that point in time the first embodiment is established as an example of the present embodiment, but making it even easier for the protective cloth 94 to slide is effective for restraining or preventing the rebounding head of the rear seat occupant P2 from turning. From this standpoint, a low-friction cloth including fluorine fiber may also be attached to, or the low-friction portion 152 using talc may also be provided on, the vehicle width direction outer surface of the protective cloth 94.

Supplemental Description of the Embodiments

In the embodiments, the curtain airbag 14 is configured by a double weave that produces a tube-shaped cloth and the coating 90 is provided on the outer surface thereof, but the curtain airbag 14 is not limited to this. A configuration may also be adopted where the curtain airbag is configured by applying a coating to one side of a single base cloth, folding the coated cloth at a centerline so that the coating is on the inner side, and sewing the outer peripheral portion of the coating cloth. In this case, the coefficient of friction of the outer surface of the curtain airbag becomes lower than the coefficient of friction of the inner surface of the curtain airbag, so in terms of the relationship with the seventh embodiment, a protective cloth whose coefficient of friction is lower than that of the base cloth is used or a low-friction portion whose coefficient of friction is lower than that of the base cloth is provided on the vehicle width direction outer surface of the protective cloth.

Furthermore, in the embodiments, the inflator 12 is configured to be activated at the time of a side impact, at the time of a rollover, and at the time of a frontal impact including at the time of a small overlap impact and at the time of an oblique impact, but the inflator is not limited to this and may also be configured to be activated in a case where it is detected beforehand (predicted) that these impacts are unavoidable. That is, for example, "at the time of an oblique impact" in the present invention includes a case where an oblique impact has actually occurred and a case where an oblique impact is predicted. The same also holds true for "at the time of a side impact", "at the time of a frontal impact", and "at the time of a small overlap impact" in the present invention. It will be noted that in the case of activating the inflator when an impact is predicted, for example, the vehicle curtain airbag device may be configured to use a camera such as the on-board camera 84, or an impact prediction sensor such as a millimeter-wave radar may be newly added, or the vehicle curtain airbag device may be configured to use both a camera and an impact prediction sensor.

What is claimed is:

1. A vehicle curtain airbag device comprising:
an inflator that is activated to discharge a gas at both a time of a side impact and a time of a frontal impact, the frontal impact including at least a small overlap impact and an oblique impact;
a curtain airbag which, when the gas from the inflator is supplied thereto, becomes inflated and deployed in a shape of a curtain in a vehicle downward direction from a vehicle width direction outer end portion of a vehicle ceiling;
the curtain airbag comprising a rear seat side impact chamber configured to be disposed on a vehicle width direction outer side of a head of an occupant who is seated in a rear seat and wearing a three-point seat belt device;
the curtain airbag comprising a front chamber disposed on a vehicle front side of the rear seat side impact chamber with a non-inflating portion being interposed in between, and a thickness of the front chamber, measured inward in the vehicle width direction from the non-inflating portion, in a completely deployed state of the curtain airbag, is thinner than a thickness of the rear seat side impact chamber measured inward in the vehicle width direction from the non-inflating portion; and
a protective cloth that is configured separately from the curtain airbag, is anchored to at least an upper edge side of the curtain airbag, is disposed ranging from a vehicle width direction inner surface of a front portion of the rear seat side impact chamber to a vehicle width direction inner surface of a rear portion of the front chamber, in the completely deployed state of the curtain airbag, and covers, from a vehicle width direction inner side, a recess portion that has different heights in a bag thickness direction and that is formed between the front portion of the rear seat side impact chamber and the rear portion of the front chamber.

2. The vehicle curtain airbag device according to claim 1, wherein the protective cloth is a cloth whose out-of-plane stiffness is higher than that of a base cloth configuring the curtain airbag.

3. The vehicle curtain airbag device according to claim 1, wherein a coefficient of friction of a vehicle width direction outer surface of the protective cloth is set lower than a coefficient of friction of the vehicle width direction inner surface of the rear seat side impact chamber.

4. The vehicle curtain airbag device according to claim 1, wherein the protective cloth is anchored to a lower edge side in addition to the upper edge side of the curtain airbag.

5. The vehicle curtain airbag device according to claim 1, wherein the protective cloth is configured to be partially disposed in an up and down direction central region of the curtain airbag with which the head of the occupant seated in the rear seat comes into abutting contact.

6. The vehicle curtain airbag device according to claim 5, wherein
one end portion of a first strap is connected or joined to an upper edge side of the protective cloth and another end portion of the first strap is anchored to an upper edge portion of the curtain airbag, and
one end portion of a second strap is connected or joined to a lower edge side of the protective cloth and another end portion of the second strap is anchored to a lower edge portion of the curtain airbag.

7. The vehicle curtain airbag device according to claim 6, wherein positions at which the first strap and the second strap are anchored to the curtain airbag are disposed offset in the vehicle rearward direction with respect to positions at which the first strap and the second strap are connected or joined to the protective cloth.

* * * * *